United States Patent
Sinclair

(10) Patent No.: US 11,393,200 B2
(45) Date of Patent: Jul. 19, 2022

(54) HYBRID FEATURE POINT/WATERMARK-BASED AUGMENTED REALITY

(71) Applicant: Digimarc Corporation, Beaverton, OR (US)

(72) Inventor: Emma C. Sinclair, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 22 days.

(21) Appl. No.: 16/989,163

(22) Filed: Aug. 10, 2020

(65) Prior Publication Data
US 2021/0019526 A1 Jan. 21, 2021

Related U.S. Application Data

(62) Division of application No. 15/955,481, filed on Apr. 17, 2018, now Pat. No. 10,740,613.
(Continued)

(51) Int. Cl.
*G06V 20/20* (2022.01)
*G06T 7/73* (2017.01)
(Continued)

(52) U.S. Cl.
CPC ............ *G06V 20/20* (2022.01); *G06T 1/0021* (2013.01); *G06T 7/73* (2017.01); *G06T 19/006* (2013.01);
(Continued)

(58) Field of Classification Search
None
See application file for complete search history.

(56) References Cited

U.S. PATENT DOCUMENTS

| 6,526,284 B1 | 2/2003 | Sharp |
| 6,711,293 B1 | 3/2004 | Lowe |

(Continued)

FOREIGN PATENT DOCUMENTS

| GB | 2566365 | 3/2019 |
| WO | 2013138846 A1 | 9/2013 |
| WO | 2015192117 A1 | 12/2015 |

OTHER PUBLICATIONS

Deng, et al, Fine-grained crowdsourcing for fine-grained recognition, Prov. of the IEEE Conference on Computer Vision and Pattern Recognition 2013, pp. 580-587.
(Continued)

*Primary Examiner* — Frank S Chen
(74) *Attorney, Agent, or Firm* — Digimarc Corporation

(57) ABSTRACT

A camera captures video imagery depicting a digitally-watermarked object. A reference signal in the watermark is used to discern the pose of the object relative to the camera, and this pose is used in affine-transforming and positioning a graphic on the imagery as an augmented reality overlay. Feature points are also discerned from the captured imagery, or recalled from a database indexed by the watermark. As the camera moves relative to the object, the augmented reality overlay tracks the changing object depiction, using these feature points. When feature point-based tracking fails, the watermark is again processed to determine pose, and the overlay presentation is updated accordingly. In another arrangement, feature points are extracted from images of supermarket objects captured by multiple users, and are compiled in a database in association with watermark data identifying the objects—serving as a crowd-sourced repository of feature point data. A great number of other features and arrangements are also detailed.

20 Claims, 19 Drawing Sheets

Related U.S. Application Data

(60) Provisional application No. 62/548,887, filed on Aug. 22, 2017, provisional application No. 62/487,678, filed on Apr. 20, 2017.

(51) Int. Cl.

| | | |
|---|---|---|
| *G06T 19/00* | (2011.01) | |
| *G06T 1/00* | (2006.01) | |
| *H04M 1/72427* | (2021.01) | |
| *G06T 3/00* | (2006.01) | |

(52) U.S. Cl.
CPC ....... *H04M 1/72427* (2021.01); *G06T 3/0006* (2013.01); *G06T 2201/0051* (2013.01); *G06T 2201/0061* (2013.01); *G06T 2201/0601* (2013.01); *G06T 2207/30244* (2013.01)

(56) References Cited

U.S. PATENT DOCUMENTS

| | | |
|---|---|---|
| 8,816,179 B2 | 8/2014 | Wang |
| 9,906,921 B2 | 2/2018 | Chao |
| 10,007,964 B1 | 6/2018 | Calhoon |
| 2007/0146391 A1 | 6/2007 | Pentenrieder |
| 2007/0189533 A1 | 8/2007 | Rhoads |
| 2010/0208057 A1 | 8/2010 | Meier |
| 2010/0322469 A1 | 12/2010 | Sharma |
| 2011/0161076 A1 | 6/2011 | Davis |
| 2011/0212717 A1 | 9/2011 | Rhoads |
| 2011/0214044 A1 | 9/2011 | Davis |
| 2012/0200743 A1* | 8/2012 | Blanchflower .... H04N 21/4223 348/239 |
| 2012/0218444 A1 | 8/2012 | Stach |
| 2012/0219188 A1 | 8/2012 | Kurz |
| 2012/0275642 A1 | 11/2012 | Aller |
| 2013/0242106 A1 | 9/2013 | Jussi |
| 2013/0248602 A1* | 9/2013 | He ..................... G06K 7/10752 235/455 |
| 2014/0052555 A1 | 2/2014 | Macintosh |
| 2014/0119593 A1 | 5/2014 | Filler |
| 2014/0129354 A1 | 5/2014 | Soon-Shiong |
| 2014/0177968 A1* | 6/2014 | Lee ..................... G06K 9/6211 382/199 |
| 2014/0304122 A1 | 10/2014 | Rhoads |
| 2015/0016712 A1 | 1/2015 | Rhoads |
| 2016/0125252 A1 | 5/2016 | Harada |
| 2016/0180540 A1* | 6/2016 | Lookingbill ....... G06K 9/00208 382/154 |
| 2016/0189381 A1 | 6/2016 | Rhoads |
| 2016/0321502 A1 | 11/2016 | Kamath |
| 2016/0343165 A1* | 11/2016 | Park ................... G06K 9/00671 |
| 2017/0083748 A1* | 3/2017 | Zhou ................... G06K 9/00771 |
| 2017/0178310 A1* | 6/2017 | Gormish .............. G06K 9/6267 |
| 2017/0374399 A1* | 12/2017 | Rao .................... H04N 21/475 |
| 2018/0247122 A1 | 8/2018 | Dong |

OTHER PUBLICATIONS

Chen, et al, Rise of the indoor crowd: Reconstruction of building interior view via mobile crowdsourcing, Proc. of the 13th ACM Conference on Embedded Networked Sensor Systems Nov. 1, 2015, pp. 59-71.

* cited by examiner

| 1 | 2 | 3 | 4 | 5 | 6 | 7 | 8 | 9 | 10 | 11 | 12 |
|---|---|---|---|---|---|---|---|---|---|---|---|
| 13 | ⊗ | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 |

FIG. 4

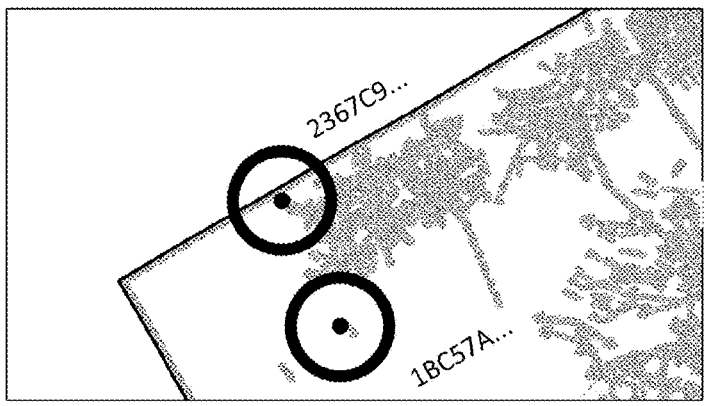
FIG. 8
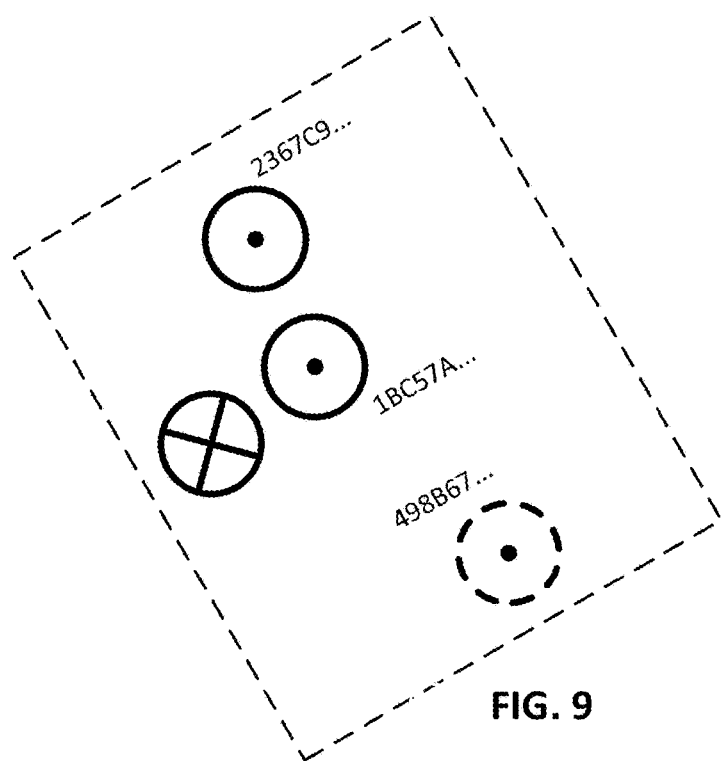
FIG. 9
FIG. 10
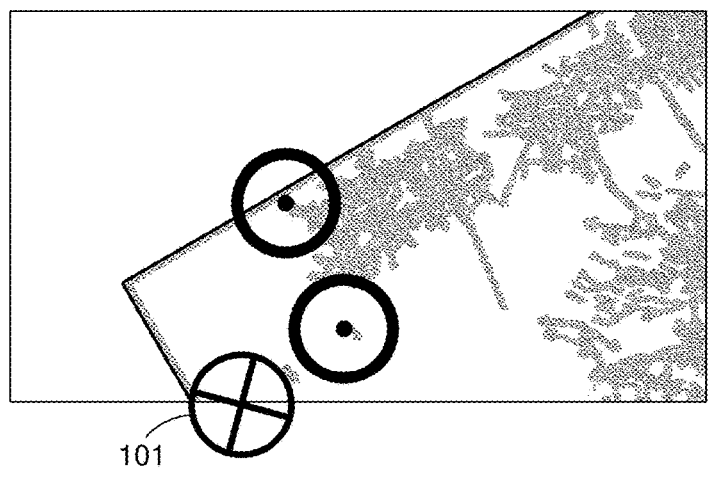

| WATERMARK BLOCK | WAXEL OFFSETS, KEYPOINT DESCRIPTORS |
|---|---|
| 26DE4-1 | 51.5;12;170BD08ECB157222D5D1F0C81723ABA4...<br>2;25.5;9B1D374B8419EE76ED3DA03A77AC847F...<br>118.5;60.5;57F31F4C7B024FD5C5F3FC8E5510FC12...<br>16;44.5;ED3A2CA8686025D7EE8A1D59693ADC12...<br>... |
| 26DE4-2 | 36;110;BFE5D3CFE66BE7320C478DC98AE0B133...<br>58;107;784B4782A7B61B5E2BB7149A281D6D1D...<br>46;110;B7851F3AA62301FD87B79C9ECFF57DBA...<br>102.5;45.5;97192E0154BB2F928D5FD9B6CAD80B41...<br>... |
| 26DE4-3 | 123.5;116.5;ECCD5E1361841D6995981E5A120AA0BD...<br>34.5;86.5;280999AF312062535E1F09FD362D5BAD...<br>24;49.5;9856F54C3B0DEC1F4C81E18DE7ACA4BA...<br>37.5;93.5;D31BB15B75D974BF44633C8062765B3E...<br>... |

...

HYBRID FEATURE POINT/WATERMARK-BASED AUGMENTED REALITY

RELATED APPLICATION DATA

This application is a divisional of U.S. application Ser. No. 15/955,481, filed Apr. 17, 2018 (now U.S. Pat. No. 10,740,613), which claims priority from provisional applications 62/548,887, filed Aug. 22, 2017, and 62/487,678, filed Apr. 20, 2017, the disclosures of which are incorporated herein by reference.

TECHNICAL FIELD

The present technology concerns improvements to augmented reality systems. Many embodiments make hybrid use of both feature points and digital watermarks.

BACKGROUND AND INTRODUCTION

Augmented reality (AR) is generally regarded as presentation of a (typically live) view of a physical, real-world object or scene—augmented by computer-generated elements, such as graphics. A familiar example is display of a virtual "first down line," in yellow, in a televised football game. The technology sometimes goes by the name of mixed-reality.

AR systems commonly involve one or more cameras to capture video imagery depicting the physical world, together with a display that renders the captured imagery—with augmentation—to a user. The display may be headworn (as in, e.g., the Microsoft Hololens product, and AR contact lenses), but need not be. In addition to the just-noted television example, a smartphone display can be used to provide an AR experience.

In many implementations, an AR augmentation, such as an icon or a graphic indicia, is anchored relative to a particular point within the captured scene, and moves as depiction of this point moves between frames of the captured imagery. In many systems, the particular point is a distinctive feature depicted in the captured imagery. Such a system must thus first locate the feature within the imagery, and then track this feature as its depiction moves between video frames, so the associated augmentation can spatially follow on the display screen.

In some arrangements, the distinctive feature takes the form of an overt symbol or marker that has been added to the scene (or object) in order to enable augmentations. An early example was the ARToolKit marker—a square black and white pattern akin to a QR code. Barcodes, themselves, can similarly be introduced into a scene to serve as AR markers. Such markers are sometimes termed "fiducials," and commonly enable the viewing system to discern a relative orientation and distance to the marker.

Another form of marker—especially useful with printed objects—is a steganographic pattern. Such a pattern is not evident to human viewers, but can be discerned and localized by a compliant detector. Such technology is commonly known as digital watermarking, and is detailed in exemplary references, below.

More recently, augmentations need not be anchored relative to a marker, per se. Instead, the marker can encode an identifier that enables access to a set of distinctive scene feature points. Augmentations can then be anchored relative to these feature points that naturally occur within the scene.

One such arrangement is offered by Zappar, Ltd., under the name Zapcodes. In that system, an overt machine-readable indicia is included in known imagery, such as cereal box artwork, or a web page. This indicia encodes a plural-bit identifier that is associated—in a remote database—with (1) information about an overlay graphic to be presented to users; and (2) feature point information for the imagery (e.g., cereal box artwork) in which that indicia is found. (This reference imagery may be termed a "tracking image.")

When a user's smartphone captures imagery of the overt machine-readable indicia, a local app decodes the plural-bit identifier, and sends it to the database. The database responds by sending information about the overlay graphic to the phone, together with the stored feature point (a.k.a. keypoint, or salient point) information for the tracking image referenced by the overt indicia. As the user moves the smartphone relative to the tracking image, these feature points allow the phone to discern its pose relative to the tracking image. The app then adapts the position, scale and orientation of the overlay graphic in accordance with the discerned phone pose, and renders it atop the imagery being captured by the phone camera.

Adjustments to the size of the rendered overlay depend on the spacings of the detected feature points. If the points begin moving further apart, this indicates the camera is moving towards the tracking image, so the overlay graphic is presented at progressively increasing pixel-size. Conversely, if the feature points are moving closer together, this indicates the camera is moving away from the tracking image, so the overlay is presented at progressively decreasing size.

It will be recognized that the just-reviewed arrangement cannot discern any pose information for the phone (relative to the tracking image), until the database has responded with feature point data for that tracking image. If communication with the database is lost, and no feature points can be downloaded, no augmentation can happen (unless the phone has pre-loaded an entire catalogue of tracking images).

Moreover, the just-detailed arrangement requires the tracking image to be known in advance (and pre-processed to identify the feature points) before it can serve as the basis for an AR experience.

Certain embodiments of the present technology redress one or more of these shortcomings, and provide other features in certain instances.

BRIEF DESCRIPTION OF THE DRAWINGS

FIG. 4 shows the anchor point in the frame of reference defined by the watermark blocks.

FIG. 8 identifies feature points discerned from new camera imagery, whose descriptors correspond to those of two feature points in the FIG. 7B template.

FIG. 9 illustrates how the FIG. 7B template can be scaled and rotated so that the feature points in the new camera imagery spatially align with feature points in the FIG. 7B template.

FIG. 10 depicts how the scaled and rotated template reveals the position of the anchor point in the new camera imagery.

DETAILED DESCRIPTION

Figure 1:
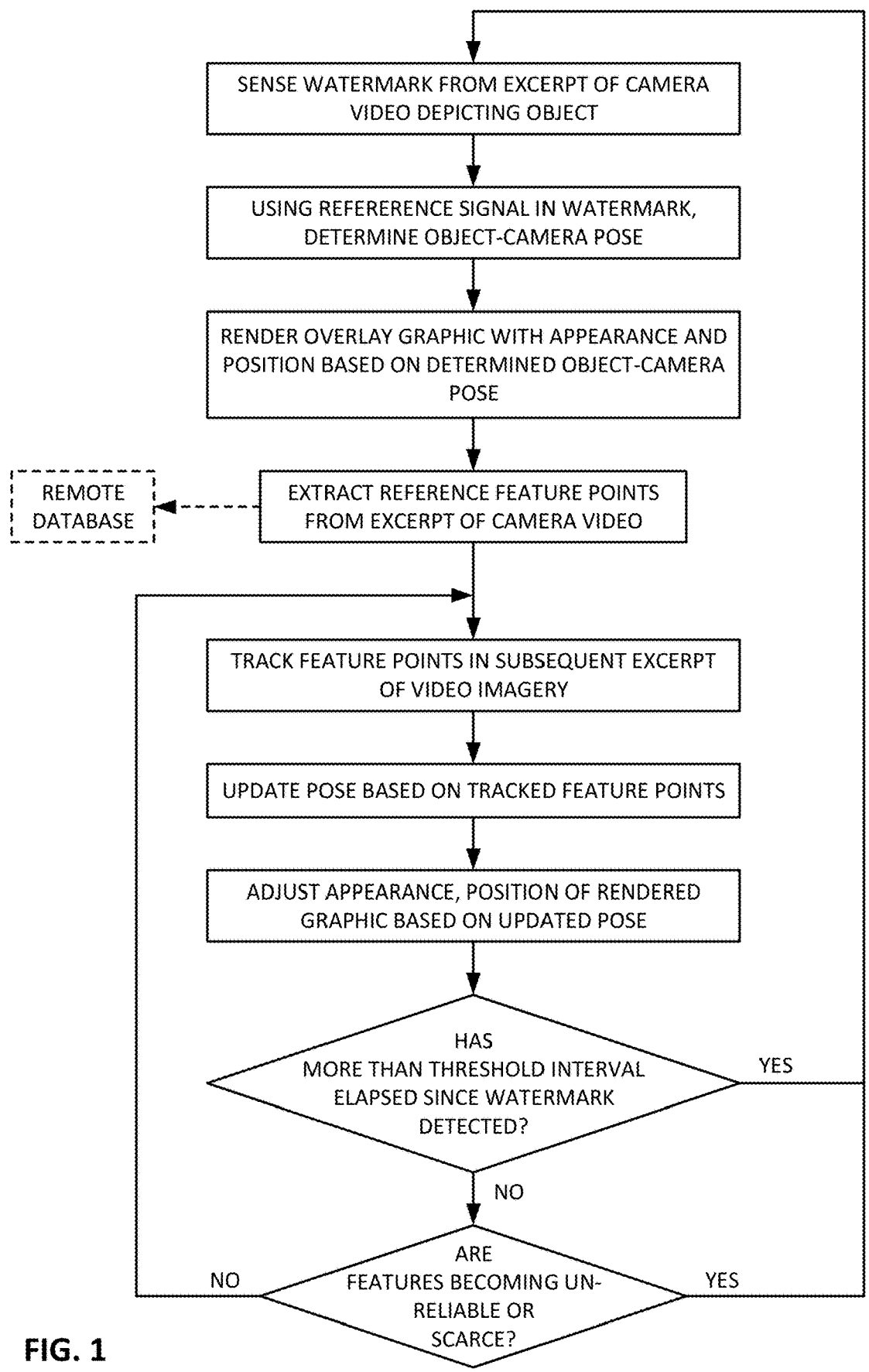
FIG. 1 is a flow chart detailing one aspect of the present technology.

For expository convenience, the technology is described primarily in the context of planar objects, such as the front of a cereal box. However, from such teachings, extension of the detailed methods to non-planar targets (e.g., a cereal box having six sides, cylindrical cans, etc.) is straightforward.

In a first particular embodiment, a phone camera captures imagery from a cereal box. A region in the center of the captured frame is analyzed for the presence of a watermark signal. If a watermark block is found in this region, the presentation of certain known reference signal components within the watermark (e.g., known spatial frequency maxima) reveals the pose of the watermark block relative to the phone. (More particularly, as disclosed in references cited below, it indicates the affine transformation of the watermark block as sensed by the camera, as compared to the block's original presentation within the cereal box artwork.) The payload decoded from the watermark can be used to identify a corresponding graphic to be rendered atop the captured imagery, by reference to either a local or remote data store. (The watermark payload typically conveys a Global Trade Identification Number (GTIN) that identifies the product.) Alternatively, a default graphic can be employed.

In an exemplary embodiment, the watermark block was originally encoded in the cereal box artwork so that each of the 128×128 "waxels" comprising the block was represented by a 4×4 area of pixels, at 300 dpi (i.e., spanning a block of printed pixels that is 512 pixels on a side). If the watermark block that is now sensed in the camera-captured imagery similarly spans a region that is 512 camera pixels on a side, the watermark is said to be sensed at a scale of 1.0. If the block spans a regions that is 256 camera pixels on a side, the camera is viewing the box from a greater distance; the watermark is said to be sensed at a scale of 0.5. Etc.

This watermark scale data provides a metric by which the phone can adjust the size of the overlay graphic. For example, the size of the graphic can be adjusted by a factor equal to the sensed watermark scale. If the overlay graphic is defined to have a nominal width of 100 pixels, and the watermark is sensed with scale=2, then the phone can render the graphic with a width of 200 pixels.

(The just-described scale is proportional to the camera-object distance. However, the particular mapping between scale and physical distance depends on the camera's focal length and other parameters. Often, the physical camera-object distance is not important; the augmentation is based on scale.)

The position at which the graphic is to be overlaid on the captured imagery can also be established by reference to the watermark block.

In an illustrative embodiment, the "origin" of a watermark block is its top left corner. The width of the watermark block—in smartphone camera pixels or display pixels—can define a distance of 128 "units" (waxels, actually), in terms of which the graphic overlay can be positioned. For example, if a graphic is to be rendered at the center of a watermark block, its "anchor" position can be specified as {64,64} units relative to the watermark block origin. (The first coordinate is displacement across, to the right, from the top left corner; "x" if you will. The second coordinate is displacement down from the top left corner; "y" if you will.) Such a frame of reference can extend beyond the limits of the one detected watermark block.

(A reference point on the graphic overlay is placed at the anchor point in the image. This reference point can be, e.g., the center of a 2D graphic. If the graphic is a 3D shape, the reference point can be the center of its base.)

As the phone is moved relative to the watermarked cereal box, the watermark decoder software can analyze the watermark signal to extract updated affine pose parameters. With the changing pose parameters, the phone can adjust the rendering of the overlay graphic in accordance with the phone motion.

The process of extracting updated pose parameters from the watermark is easier than initially discerning the camera pose, because much information is already known. For example, initially the watermark detector did not know the watermark scale, and so had to search the captured imagery for watermarks over a large range of scale states. Once determined, however, the initial watermark scale state value can serve to narrow the range of search states that must be considered in updating the camera pose.

Similarly in finding the translational position of the watermark block within the captured imagery. Initially, the central region of the captured image frame was searched to find a watermark block. With knowledge of the watermark block's initial position (possibly aided by insight into device motion provided by phone accelerometers, gyroscopes, magnetometers, etc.), a more tightly-bounded search region of image pixels can be analyzed to determine and update the position for the watermark block.

The rotation of the depicted watermark, relative to its original orientation, must also be sleuthed as part of the initial watermark decoding operation, from a range of up to 360 degrees. Again, knowledge of a previous rotation parameter expedites determination of an updated rotation parameter.

Despite such shortcuts, applicant has discovered that tracking the phone's pose, and/or determining the corresponding presentation of an augmentation, can sometimes be performed more economically (e.g., in terms of battery drain, processor cycles, etc.) by reference to feature points. While reference feature points for the cereal box artwork may be pulled from a database, based on the decoded watermark identifier, applicant sometimes prefers to determine reference feature points for the cereal box "on the fly."

When a watermark is initially sensed from a frame of imagery, the pose of the phone—relative to the watermarked cereal box—is accurately characterized by affine parameters discerned from the watermark reference signals. The overlay graphic can be initially presented based on such camera pose. From this camera image, reference feature points are also extracted, and can be stored in a reference data structure. The camera-cereal box pose to which this presentation of feature points corresponds is known from the watermark information. Thereafter, determining the camera-cereal box pose, and making adjustments to the rendered graphic in accordance with changes to this pose, proceed by visual tracking of the detected feature points, from their initial reference positions just-determined. Such arrangement is shown by the flowchart of FIG. 1.

As the phone is moved relative to the box, and further frames of imagery are captured (e.g., video frames at 30 fps), portions of the box may come into view that were not earlier depicted. Judging from the reference feature point data stored in the data structure, the virtual plane on which the reference feature points lie (i.e., the cereal box surface) is devoid of feature points in this newly-depicted region. This lack of knowledge is redressed by detecting additional feature points from new image excerpts that come into view, and adding these newly-noted feature points to the reference data structure—extending the information known about the box. Pose determination and augmentation presentation then continues as before, but now is based on the newly-discovered reference feature points, as well as on the earlier-known reference feature points.

Desirably, throughout this process, frames of captured imagery are occasionally analyzed for watermark signals, and the camera-cereal box pose is re-determined based on the watermark information. This serves as a check on the feature point-indicated pose information. If the two poses are found to be at variance, the watermark-indicated pose is taken as more definitive, and the spatial model based on feature points is updated so that it matches the watermark-indicated pose.

The frequency of watermark-based pose determination depends on the requirements of the particular application. In some embodiments, watermark-based pose determination is performed periodically, such as once every ten or fifty frames. This interval may be fixed, or it may vary depending on a metric related to confidence in the feature point-based pose determination. For instance, if pose tracking is based on a large set of feature points, then a watermark-based pose recalibration may be performed less often than if pose tracking is based on a smaller set of feature points. In still other embodiments, watermark-based pose determination is performed opportunistically, e.g., based on a momentary drop in processing resources consumed by other processes.

Thus, in the just-described embodiment, watermark information is used to determine the initial phone-object pose, which, in turn, can be used to adjust the graphic for initial rendering. (The watermark information may also be used in determining which graphic is to be overlaid.) However, tracking of the camera-object pose, and related adjustments to the rendered graphic, thereafter rely primarily on tracking the motion of feature points—both those that were extracted from the initially-captured imagery, as well as those that are newly-discovered later.

In an illustrative embodiment, a common data structure is employed to store both feature point and watermark information. This can facilitate reconciling the watermark- and feature point-based frames of reference, and otherwise establishing a mapping therebetween.

Figure 2B:
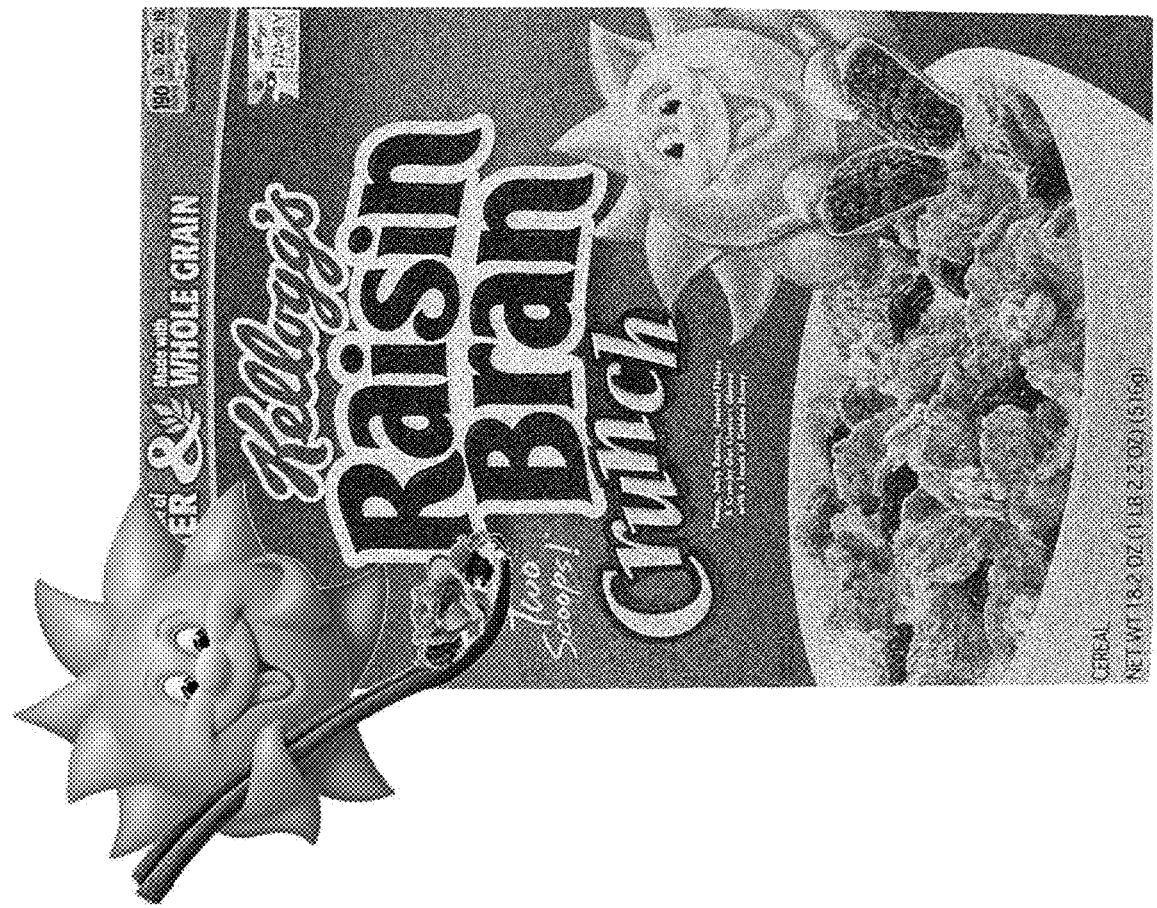
FIG. 2B shows the cereal box of FIG. 2A augmented by an overlaid sun graphic, positioned at an anchor point.
Figure 2A:
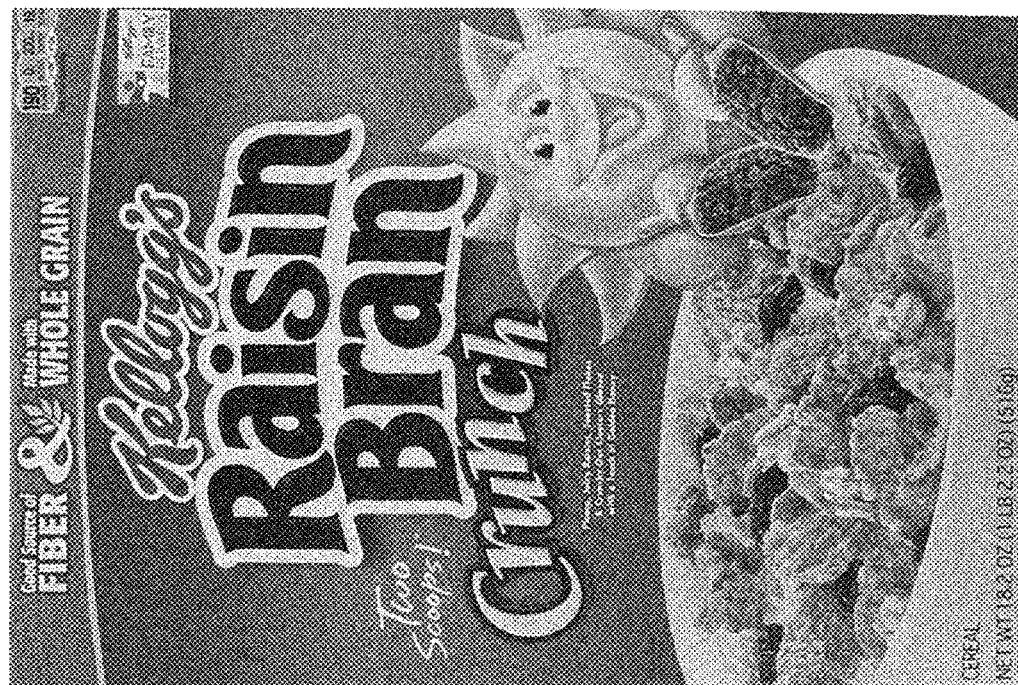
FIG. 2A shows the front face of a prior art cereal box.

Consider, as a particular example, the cereal box of FIG. 2A. Before this box (or, more accurately, a flat carton blank) was printed, its artwork was digitally watermarked by introducing subtle localized alterations to luminance and/or chrominance. As disclosed in the below-cited references, the watermark takes the form of tiled blocks that span some or all of the package. In the illustrated example, the watermark blocks are serialized—each conveying a block ID in addition to payload data, although in other embodiments such serialization is not required. (Block serialization can be accomplished by data conveyed in the usual watermark payload. Alternatively, it can be accomplished by data conveyed with the calibration signal portion of the watermark signal. U.S. Pat. No. 6,975,744 teaches an arrangement suitable for the latter.)

Figure 3:
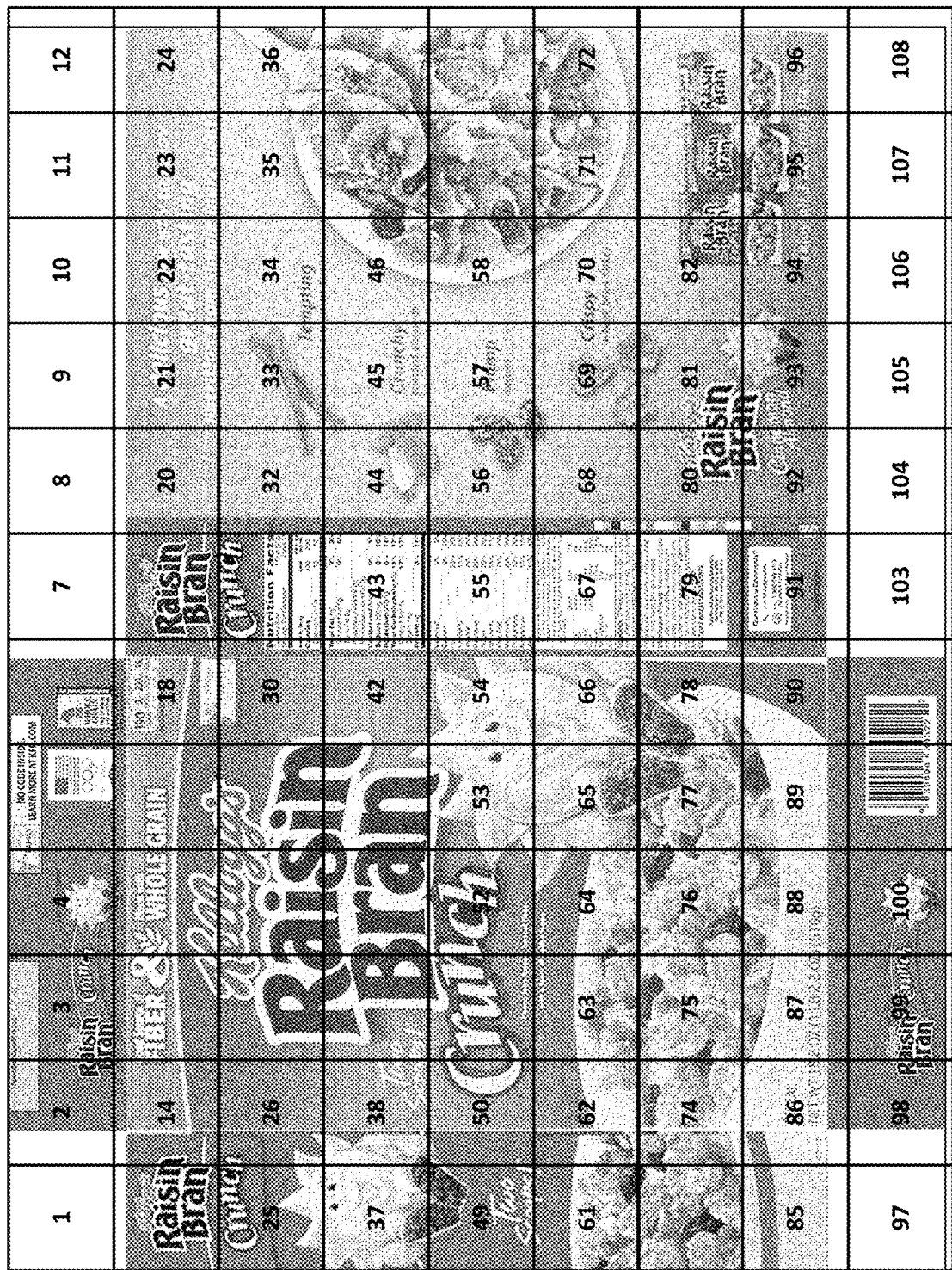
FIG. 3 is a map showing assignment of serialized watermark block identifiers to different regions of the FIG. 1 cereal box.

FIG. 3 shows an illustrative array of watermark blocks tiling the cereal box artwork. The block IDs are indicated by the bold numerals presented in certain of the blocks. (All the blocks are similarly serialized; the indicia of some are omitted simply to reduce visual complexity of the drawing.) Although the block IDs are each illustrated as an integer (call it N), they may be encoded as row/column indices. Such arrangement is shown e.g., in patent publication 20150016664. (The depicted block IDs, N, can readily be converted into such indices. The row number can be computed as 1+(INT((N−1)/12)). The column number is modulo12(N).)

Due to the irregular shape of the carton blank, some of the block IDs are not actually used; they are assigned to virtual locations off the physical media. Nonetheless, sequential block numbering can be advantageous, e.g., so that vertically-adjoining blocks always have block IDs that differ by a known number, here 12.

FIG. 2B shows an augmentation (a sun graphic) presented with the FIG. 2A cereal box. This augmentation may be achieved by positioning the graphic so that an associated reference point (e.g., the sun's nose) is placed at a specified location within the tiled array of watermark blocks.

Such placement is shown by the circled cross-hair 61 in FIG. 4. This location may be specified as Block 14 (or Block {2,2}, using row/column indices), at waxel unit coordinates {56,80}.

When a smartphone captures any part of the watermarked cereal box, it can decode the watermark payload and determine the augmentation(s) needed—even if the block in which the augmentation is anchored is not depicted in the captured imagery.

Figure 5:
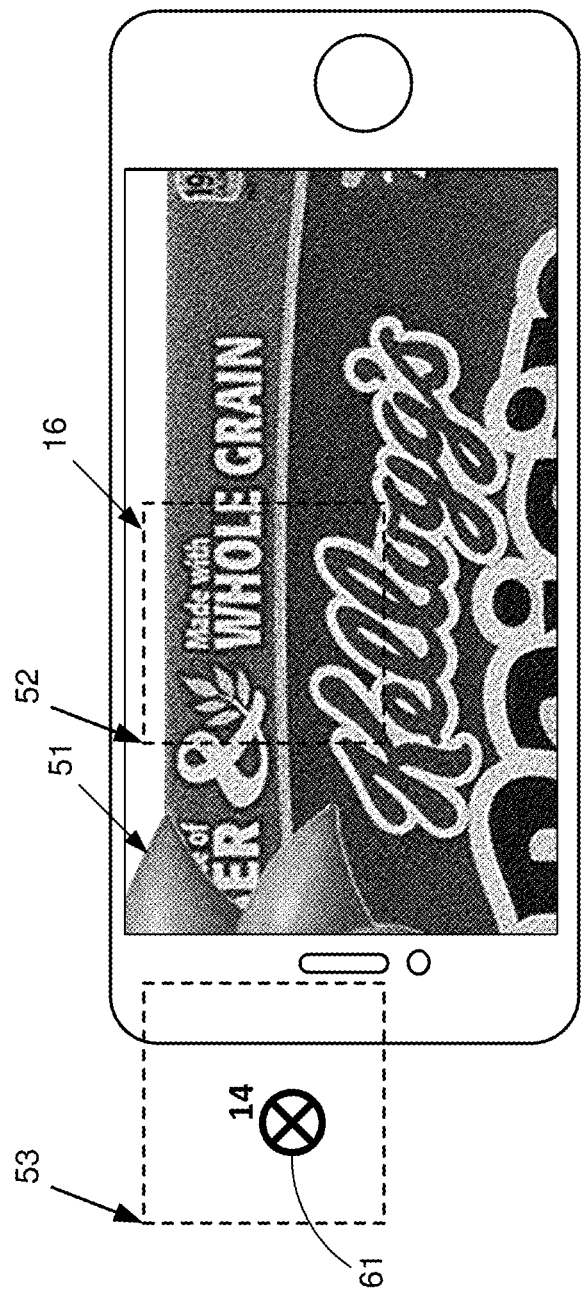
FIG. 5 shows a smartphone capturing imagery of the FIG. 1 cereal box, and depicting a portion of the overlaid sun graphic—despite the graphic's anchor point being located outside the imagery captured by the phone.

For example, the smartphone of FIG. 5 is depicted as capturing imagery that includes no part of the watermark block 14 to which the sun augmentation is anchored. (The center of the camera field of view falls in watermark block 16.) Yet if the augmentation's size should cause it to extend into the field of view captured by the camera, then the appropriate part 51 of the augmentation is rendered within the displayed frame of imagery.

This is enabled by the regularly-tiled nature of the watermark pattern. The watermark detector discerns, from the watermark's encoded reference signal, the pixel scale of the watermark block detected nearest the center of the camera-captured imagery (i.e., block 16), and the pixel location of this block's upper left corner origin 52. (In this example, we assume the camera and display resolution are the same—both 1334×750 pixels.) The depicted watermark block 16 spans 420 pixels in each direction—instead of the 512 pixel scale at which it was encoded in the cereal box artwork. So the scale of this watermark is 420/512, or 0.82. The detector here finds the pixel coordinates of origin 52 of block 16, relative to the upper left corner of the captured image frame, to be {336,31}. The smartphone app computes that the origin 53 of off-screen block 14 (in which the augmentation is to be anchored) should be 840 (420*2) pixels to the left of the origin of block 16, or at coordinates {-504,31} in the display pixel coordinate frame. The anchor 61 for the augmentation is known to be at waxel coordinates {56,80} within block 14. Due to the 0.82 scale, and the fact that each waxel was originally a 4×4 region of pixels, the anchor 61 for the augmentation is known to be at a pixel offset of {56×4×0.82, 80×4×0.82)} or {184,262} relative to the origin 53. Combined with the known pixel coordinates of origin 53 (i.e., {-504,31}) yields pixel coordinates {-320, 293} as the (out-of-frame) location where the augmentation should be anchored. Since the scale factor was determined to be 0.82, the augmentation is reduced in scale by this factor. Any part of the thus-scaled and thus-anchored augmentation that extends into the screen display should be rendered. That is, in a coordinate system defined from the anchor point 61 of the augmentation graphic, any part of the graphic at x-pixel locations between 320 and 1654 (i.e., spanning the 1334 pixels of screen width), and y-pixel locations between -293 and 457 (i.e., spanning the 750 pixels in screen height) should be rendered on the display.

Figure 6:
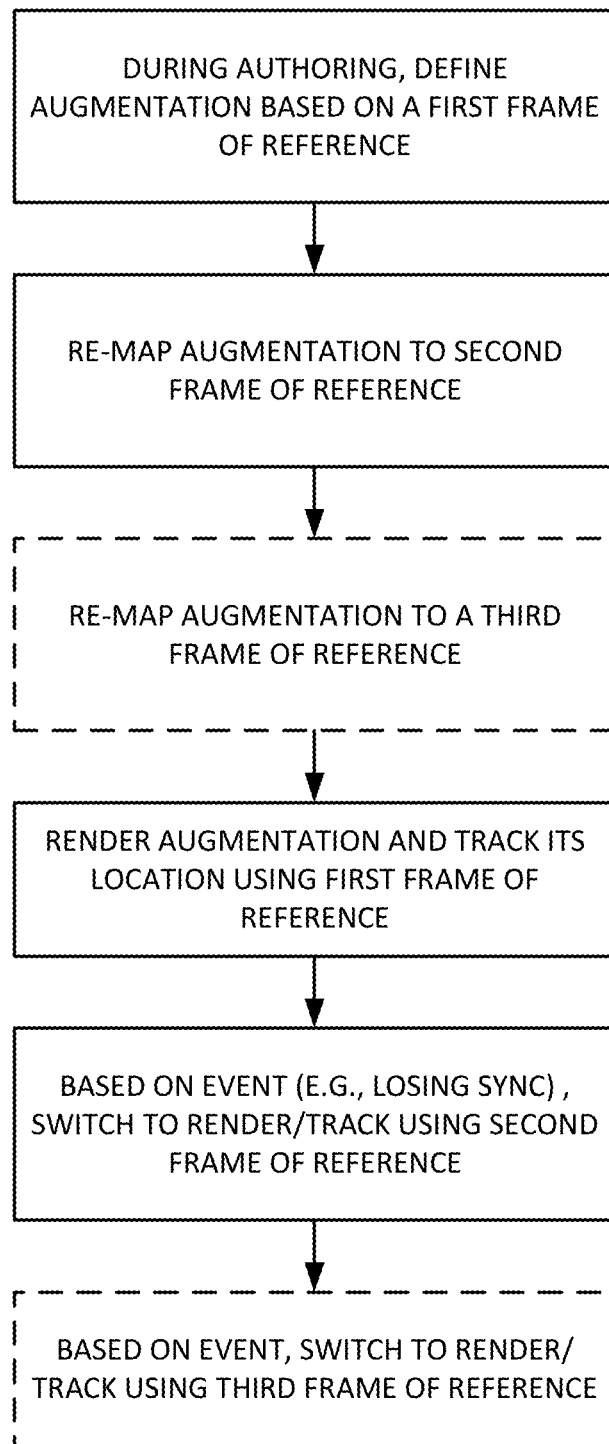
FIG. 6 is a flowchart illustrating one aspect of the present technology

As noted earlier, the frame of reference in which augmentations are authored and/or anchored can switch. That is, at times it may be desirable for an augmentation to be positioned by reference to a location in the watermark tile coordinate system; at other times it may be desirable for the augmentation to be positioned by reference to a location among the feature points. (Or, still further, the augmentation may be positioned by reference to a traditional barcode printed on the box, or other recognizable feature.) FIG. 6 is a flow chart illustrating aspects of such embodiments.

Figure 7A:
FIG. 7A shows the cereal box of FIG. 1, annotated to illustrate feature points and their descriptors at different positions, and also showing the anchor point in the feature point frame of reference.
Figure 7B:
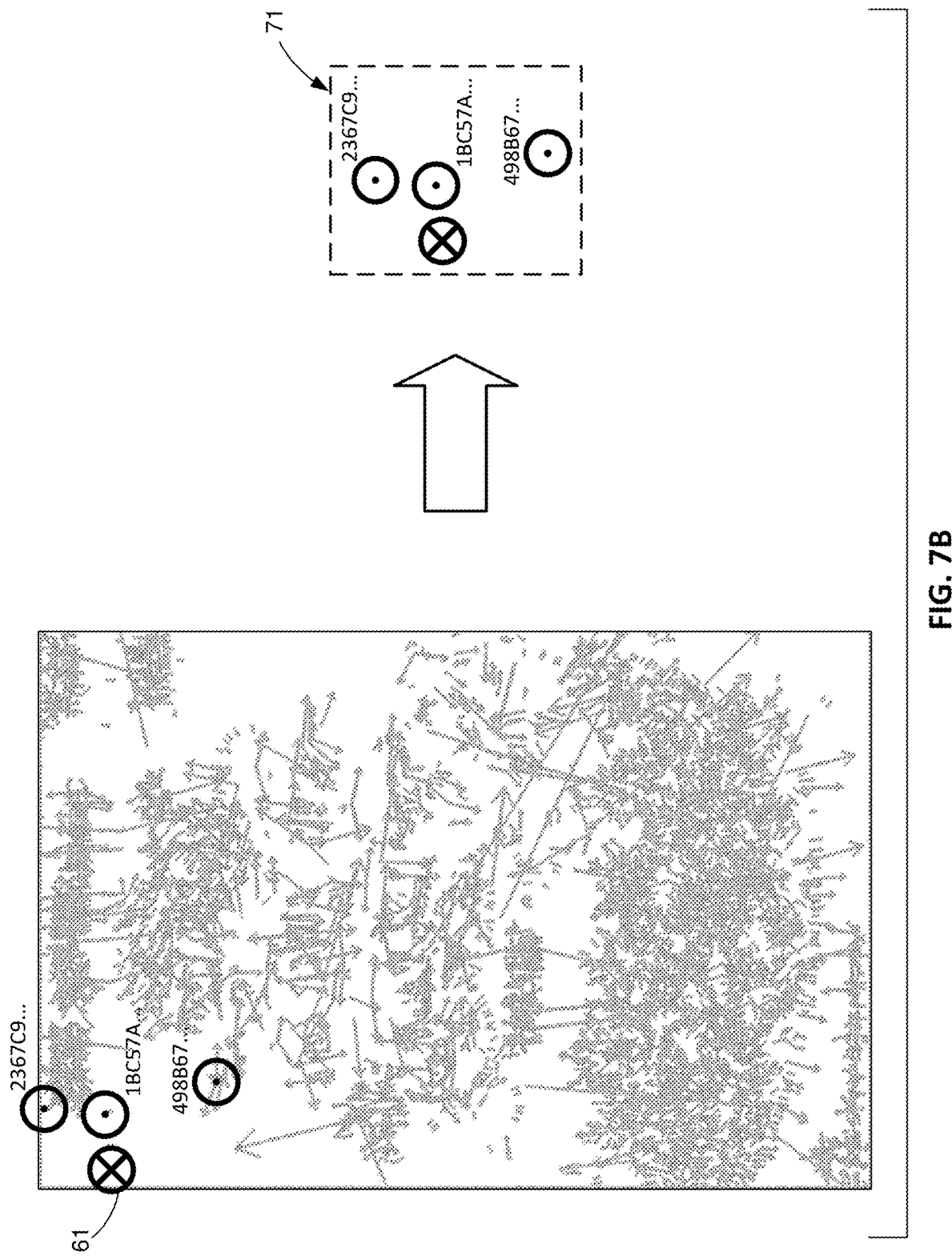
FIG. 7B shows how the augmentation anchor point can be defined in terms of its spatial context amidst two or more feature points, defining a template.

FIG. 7A shows some of the reference feature points that may be extracted from the FIG. 2A cereal box artwork, together with the desired anchor point 61 of the "sun" augmentation. FIG. 7B shows that this anchor point can be defined in the context of a spatial image patch, or template 71, that includes two or more specified feature points. (Because each feature point is described with a lengthy descriptor, such as 128 elements in the case of SIFT, correspondence between feature points specified in the patch, and feature points detected in end user-captured imagery, can be established with very high confidence.)

Figure 11:
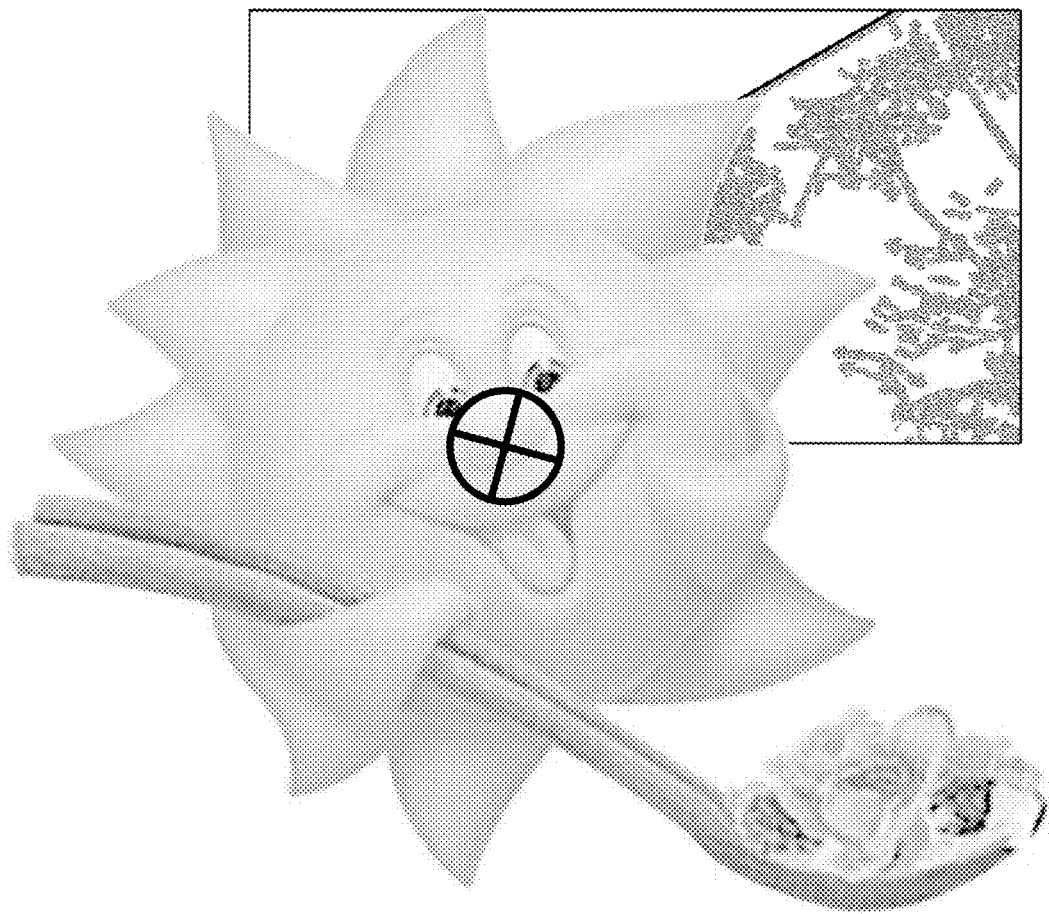
FIG. 11 illustrates how the sun graphic can be overlaid on the new camera imagery, at a position, scale, and rotational orientation, determined by the template matching procedure of the previous figures.

As shown in FIG. 8, user-captured smartphone imagery can be analyzed to extract feature points, and identify those that match (or are within a specified threshold in Euclidean distance of) feature points in the template. The template 71 (FIG. 7B) can then be affine translated so that its specified feature points spatially correspond to those in the user-captured imagery. The result of this template transformation is shown in FIG. 9, and reflects rotation by 29 degrees, and scaling by a factor of 185%. The template then indicates the position 101—relative to the matched feature points—at which the augmentation is to be anchored (FIG. 10). The augmentation, scaled by 185% and rotated 29 degrees, can then be rendered at that position (shown schematically, relative to the image frame, in FIG. 11).

A table or other data structure can relate feature point locations to the watermark-defined frame of reference. For example, such a table can specify that the feature point having the descriptor:

1BC57ABE5E45C3C8F1861C93A2573DB7E1ACA1D 904BB92310F00F751F559D7C0A7 . . .

is located at block 14, waxel coordinates {115,74}. An augmentation's anchor point may thus be specified by reference to watermark information, and/or by reference to feature points in a spatial template. If specified in only one reference frame, the smartphone app can readily determine the location of an augmentation in the other reference frame by resort to the table. If one frame of reference is computationally expensive to work in, or unreliable, the other can be used instead.

(The precision with which locations are specified is, of course, a choice left to the implementers of particular systems. SIFT and watermarks both allow location to be specified with sub-pixel precision. Generally, augmentations need not be anchored with such precision. Thus, specifying a pixel position, or a waxel position (e.g., a 4×4 block of pixels) is typically more than sufficient. Similarly, the correspondence between feature point locations and watermark locations can also generally be specified on a waxel basis. However, if desired, still-finer granularity—including sub-pixel granularity—can be utilized.)

Reference information about the watermark frame of reference for the cereal box can be stored in a database record associated with the cereal box's GTIN (obtained from the decoded watermark payload). This information can specify, e.g., that the watermark is encoded at 75 waxels per inch; that the box is printed at 300 dots per inch; that vertically-adjoining watermark blocks have block IDs that differ by 12 (as shown in FIG. 3), etc.

Figure 12:
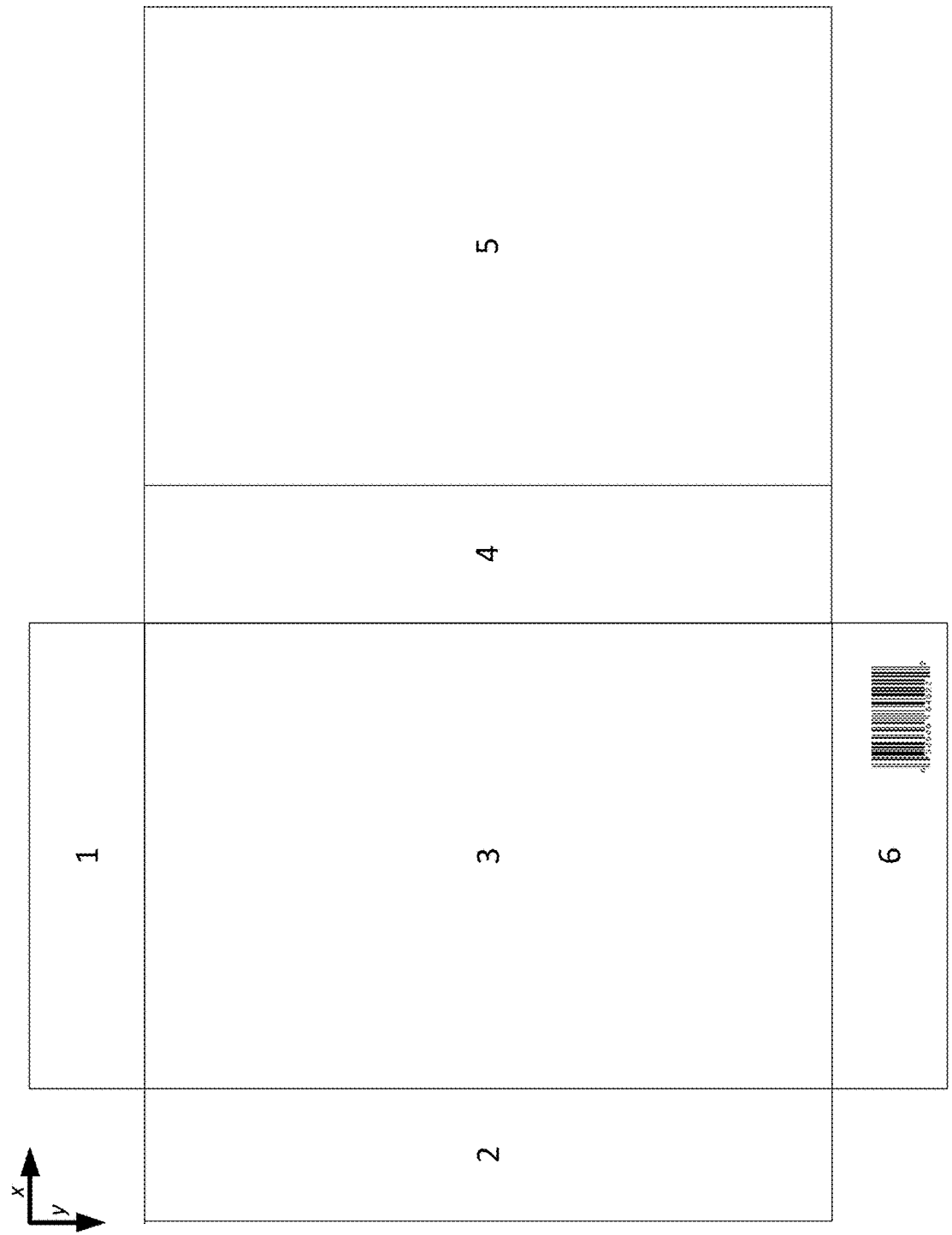
FIG. 12 shows the six faces of a serial box, and how they can be assigned face numbers.

The information stored in such a metadata database may further indicate the shape of the item (e.g., a 6-faced box, identified as faces 1-6 in FIG. 12), and may further detail the watermark coordinates (block IDs and offsets) that define bounding corners for each face. For example, the right side panel of the cereal box (face 4) can be defined as extending from block 18, waxel offset {108,14} to block 92, waxel offset {19,101}. The stored information can likewise specify the location, and extent, of any barcode printed on the box. (Naturally, all such location data can be specified in other units, such as inches, or print pixels.) This metadata database can also be the repository in which the graphic(s) used for augmentation is stored, together with information about its positioning and animation (if any).

Figure 13:
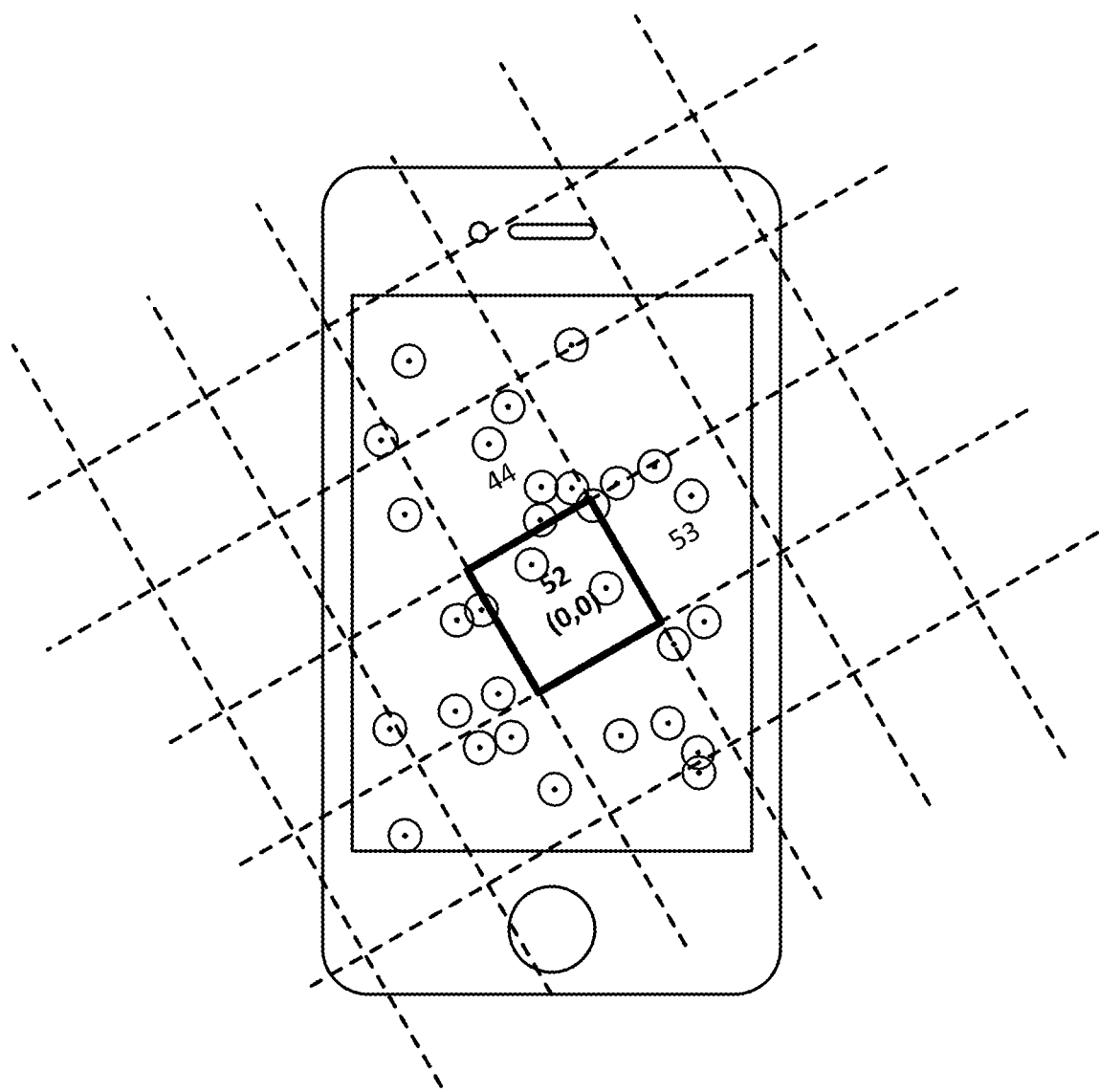
FIG. 13 shows a watermark block and feature points detected by a smartphone camera, from captured imagery corresponding to a sub-part of a cereal box face.

FIG. 13 shows a smartphone that has captured and processed a first frame of imagery. It has found a watermark signal by which it has discerned the position—including scale and rotation—of the tiled array of watermark blocks. As shown in dashed lines, this tiled array may be presumed to extend beyond the camera's limited field of view. From the payload of the block at the center of the image the phone has obtained the GTIN for the product. Blocks in this watermark are serialized, so the smartphone has also determined the block ID (52) for the block at the center.

Because the rotation angle of block 52 is known from the reference signals in the watermark, the smartphone also knows "up," "down," "left" and "right" in the tiled array. From the metadata database (accessed with the GTIN), the phone knows that vertically-adjoining blocks differ by 12 in block numbers. With this information, it can determine the block IDs for all of the depicted blocks (e.g., 51 and 53 for the left- and right-adjoining blocks; 44 and 60 for the above- and below-adjoining blocks, etc.).

As noted, the phone also performs feature point detection for the imagery within the captured frame. The locations of these feature points are shown by the little bullseyes in FIG. 13. The locations of the features points, within the frame of reference of the watermark blocks, are stored in a local reference database.

As the phone moves, and more feature points are discerned from newly-captured imagery, these are also added to the reference feature point collection, continually enhancing understanding of the surface viewed by the camera.

Figure 14:
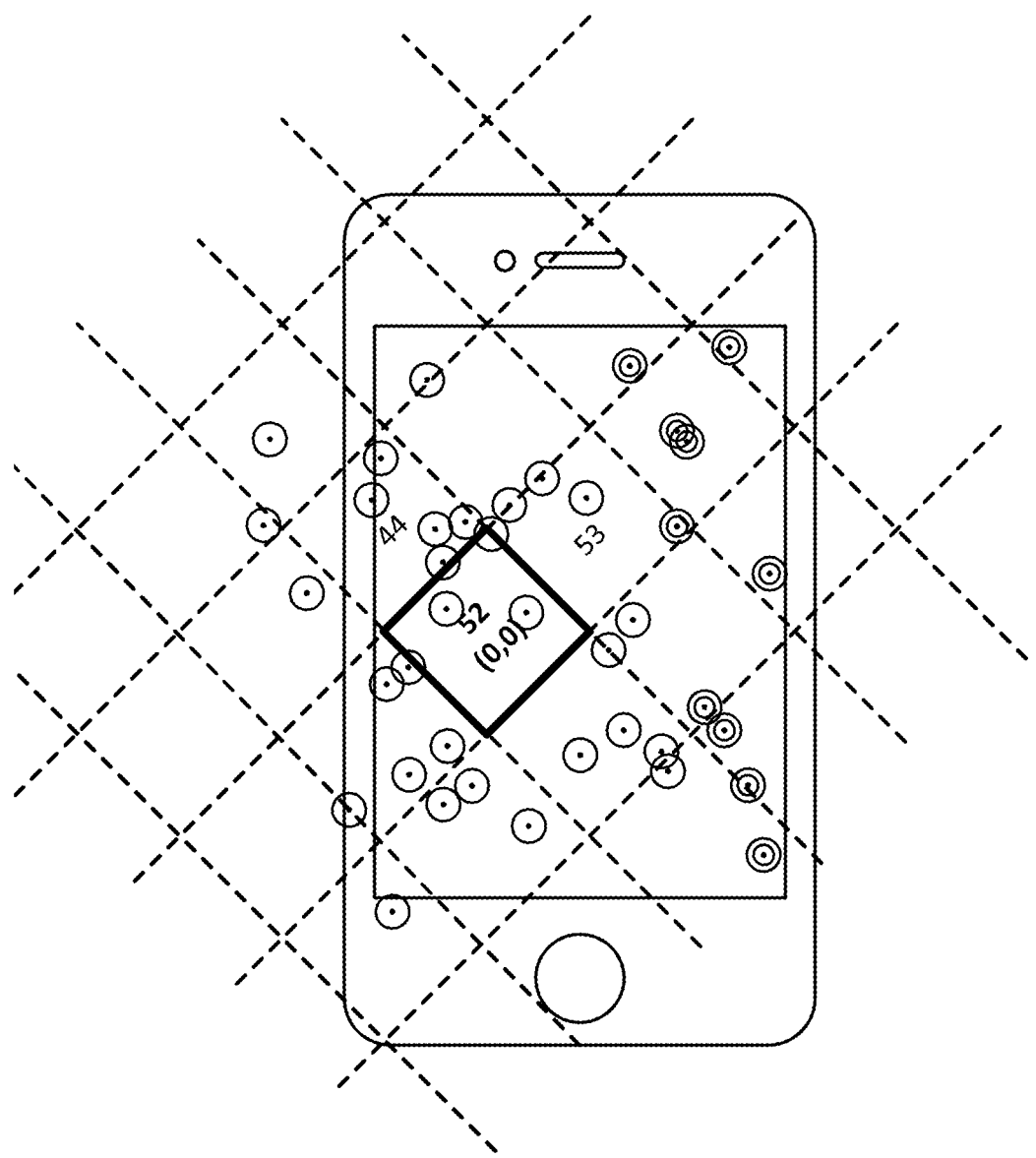
FIG. 14 shows the arrangement of FIG. 13 after capture of a few more video frames, during which the camera has moved relative to the cereal box face, changing the translation and rotation of the captured imagery.

FIG. 14 shows the FIG. 13 arrangement after the phone has been moved to the right, relative to the cereal box artwork, and has rotated 15 degrees clockwise. The newly-acquired feature points are shown by the different bullseyes. Some of the original bullseyes are outside the present frame, but their position in the watermark coordinate space is still memorialized in the local reference database.

Although it is convenient for each block to be serialized with a unique block ID, this is not essential. Instead, the block that is first detected can be regarded as a "home" block, and can serve as the origin (0,0) for a block coordinate system in which other blocks are identified by their block offsets from the home block, with positive offsets being to the right and down. Serialized block 53 is thus block (1,0) in this relative coordinate system; block 54 is (2,0); block 44 is (0,−1); etc. As more blocks come into view, and more feature points are discovered, they are stored in the local data structure by reference to such block identifiers.

At times, tracking of object/phone movement by feature points in a frame will fail, e.g., due to the object being viewed from too oblique an angle, or because too much of the object disappeared from the camera view. In a particular embodiment, when this loss of tracking synchronization happens, the system once again searches incoming frames for a watermark signal. If found, the system decodes the payload (to confirm that it understands the identity of the item being viewed, and the augmentation that should be applied) and re-determines the camera-item pose. The imagery is once again examined for matches to reference feature points previously-associated with that watermark, and tracking and augmentation continue on that basis.

(If the watermark search instead finds a watermark with a different payload, then the camera's field of view has shifted to a different item. In this case, the process can start anew.)

While the above-detailed arrangements have contemplated only "on the fly" acquisition of feature points, other embodiments can make use of previously-stored feature points, e.g., downloaded from a remote repository (such as the metadata database), or cached in a local data structure. In one particular arrangement, such a repository of feature points for an item is compiled in crowd-sourced fashion.

User A, for example, may capture imagery from a box of cereal, and may generate feature point information as detailed above. This information can be relayed for storage to a remote database—either in real time, or after the user's interaction with the cereal box has concluded.

Later, User B captures imagery from the same box of cereal. This may literally involve the same physical box, or may—more likely—involve its twin, perhaps at a different supermarket. Again, feature point information is extracted, and relayed to the remote database for storage.

A dozen, or a thousand, more users may similarly contribute. Each user captures their respective imagery under different circumstances. Different cameras. Different lighting conditions. Different glare spots. Different viewing angles. Different times of day. Different press runs of the cereal box artwork, possibly from different printing vendors. Different regions of the box being imaged. Etc.

In accordance with a further aspect of the technology, this crowd-sourced data is processed to yield an enhanced set of feature point data for the item.

One form of enhancement is to generate a consensus descriptor for each feature point. As is familiar, feature point descriptors commonly vary in minor detail from one depiction of the feature to another. (This is why a "match" between descriptors is typically specified as being within some Euclidean distance, rather than requiring identity.) After corresponding feature points in plural data sets are identified by matching, a centroid of their multi-dimensional values can be determined, and used thereafter as the reference descriptor for that point. This process can be on-going, with the reference descriptor for each feature point being repeatedly refined as more data becomes available.

In like fashion, the location of each feature point—within the watermark frame of reference for that cereal box—can be averaged from multiple reported data, to yield a consensus location on a plane of the cereal box for each feature point.

Another form of enhancement is to determine which feature points are most, or least, robust. This can be judged based on frequency of occurrence. If most smartphones that interact with a particular box of cereal submit feature point data including descriptors for points A and C, but only a few smartphones' data also includes a descriptor for point B, which is spatially located between points A and C, then point B is known to be relatively un-robust—being detected only rarely. Reliance on such feature point can then be avoided.

Reference may also be made to the quality of the captured imagery from which feature points are extracted. This quality includes camera-introduced distortions (e.g., compression, white point balancing, chroma smoothing and denoising), focal range, shake reduction, and other computational photography techniques. Quality also depends on the practices/habits of different users. This includes the distance from which the imagery was captured (relative to the object), the rotation angle at which the imagery was captured (which can implicate moiré effects of pixel grid vs. artwork elements), the speed and patience of the user (which can indicate more or less blur, etc.). Much of this information is revealed in EXIF image metadata that can be shared with the crowd-sourced database. Other of this information can be collected as additional metadata and sent with the feature points to the crowd-sourced repository. These factors can be weighted and combined (e.g., in polynomial fashion) into a figure of merit for each set of feature point data contributed to the crowd-sourced database. This figure of merit, in turn, can establish a weight that such data is accorded among other contributed data sets in producing an enhanced data set. (Thus, for example, in determining a consensus descriptor for a feature point, a received data set having an "8" figure of merit may be given twice the weight as a received data set having a "4" figure of merit, in an averaging process for determining such descriptor.)

Moreover, categorization of feature point saliency is ideally a continuous process, which may be deterministically programmed or driven by asymptotic gradient-descent-driven approaches (i.e., machine learning) so that one group of heavy users doesn't bias the crowdsourced data in a way that makes it less useful for rendering AR experiences to other, minority groups. For example, Galaxy S7 users should not so predominate the crowd-sourced process that users of old iPhone 4 phones are compromised. Likewise with grandmothers vs. toddlers, heavy caffeine users vs. abstentious monks, etc. In one arrangement, weights given to crowdsourced contributions of feature points may be balanced among different such groups so that, e.g., a contribution by an iPhone 4 phone user is given more weight than a contribution by a Galaxy S7 phone user. This can ensure that—in the aggregate—feature points found to be important by the smaller number of iPhone 4s aren't neglected when a reference set of feature point data is being assembled. (Other arrangements, of course, may not distinguish among the demographic groups from which contributed feature points originated.)

In an exemplary crowd-sourced arrangement, a user's smartphone identifies a watermark signal in imagery depicting an item, and uses the decoded watermark payload to access a database from which feature point data for that item may be retrieved (and to which feature point data may be contributed). If no such data is available, the phone proceeds as described earlier—working from feature point information that the phone generates on the fly. If, however, the database is found to include reference feature point data for that item (e.g., the enhanced feature point information of a crowd-sourced database), then such data is downloaded for use. Such data includes not just feature points within the imagery captured by the smartphone, but also feature points for portions of the item that this smartphone has not yet imaged—sometimes including feature points on product faces different than the one the phone is imaging. The phone thus has visual ground truth data, from the start of the interaction, for most or all of the item. This reference feature point data is then used in pose tracking, and presenting associated augmentation graphics, as detailed above. If the user moves the phone to a viewpoint that depicts part of the item for which no reference feature point data is available in the database-downloaded data, then it can switch to generating feature points for such imagery on the fly. At the conclusion of the interaction, feature point data extracted from phone-captured imagery can be contributed to the crowd-sourced database, desirably referenced to a watermark framework.

Figure 15:
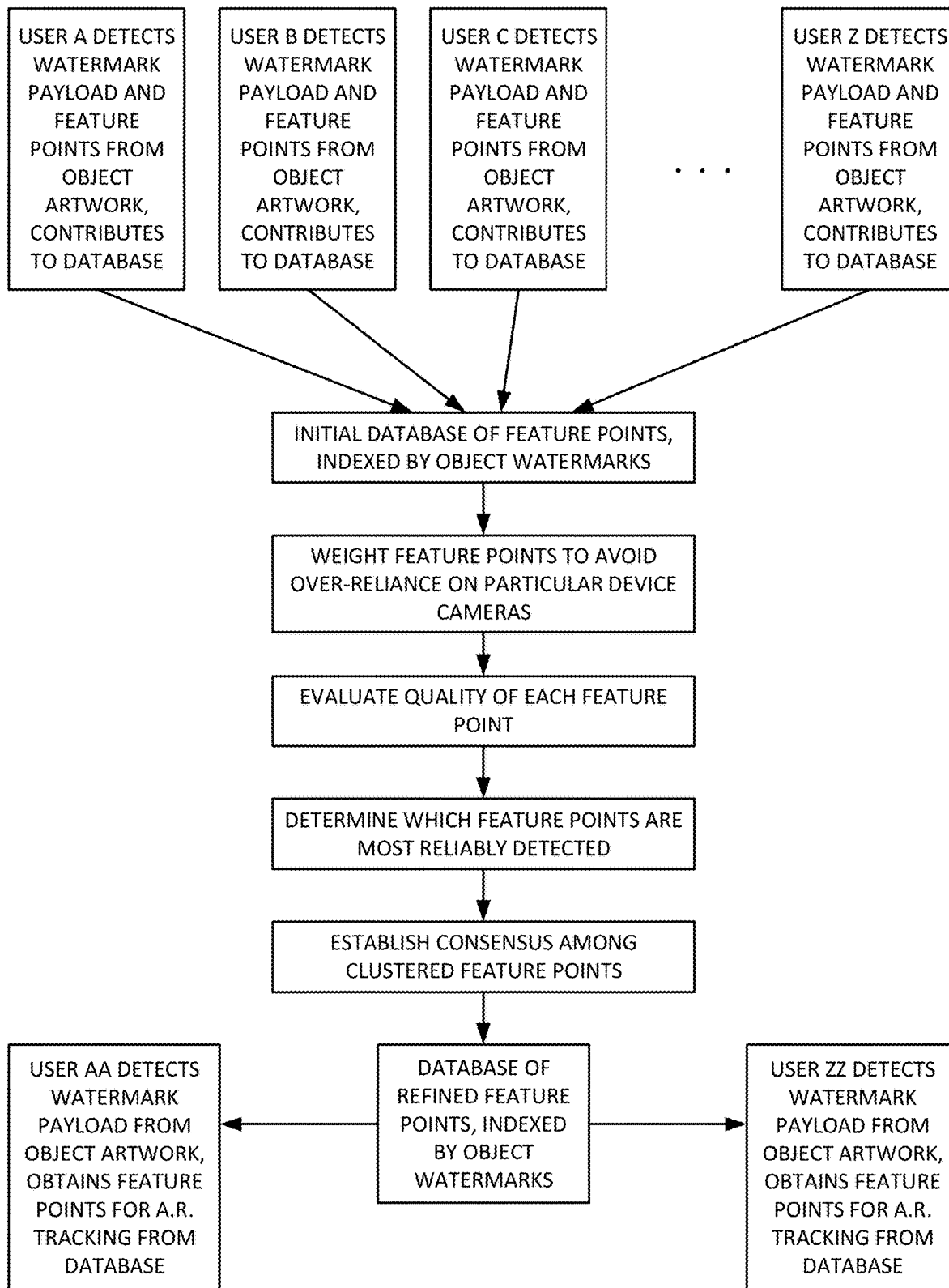
FIG. 15 shows a crowd-sourced arrangement according to an aspect of the present technology.

FIG. 15 is a flowchart showing aspects of the above-detailed crowd-sourced arrangement.

The watermark reference framework can enable use of feature points of lower quality, or of lower confidence, than might otherwise be used. Referring again to the cereal box artwork of FIG. 2A, the "Raisin Bran" logo includes two essentially identical "a" characters, two essentially identical "n" characters, and two essentially identical "i" characters. Each pair of such characters will give rise to very similar sets of feature points, which in turn can cause confusion. For example, does a feature point associated with the upper left corner of the "a" correspond to that location in the word "Raisin," or that location in the "a" of the word "Bran?" Per FIG. 3, the former point is found in watermark tile 27; the latter is found in watermark tile 40. When a feature point is used in anchoring an augmentation, reference to the associated watermark framework can avoid ambiguity.

In one particular embodiment, a feature point descriptor can be expanded to include watermark coordinates, such as tile number, x-offset in waxels, and/or y-offset in waxels. Such data can be paired with the feature point descriptor, or literally form part of it (e.g., expanding a keypoint descriptor by 24 bits, which are allocated to identify the block number, x-offset and y-offset data (e.g., 8 bits each).

Even if the descriptor isn't expanded, the watermark framework provides a good ground-truth check. Consider again the confusing keypoints arising from the pair of "a" letters in the Raisin Bran name. When tracking image movement from one frame to the next, if a keypoint corresponding to the upper left corner of an "a" character appears at one position in one frame, and a different position in a subsequent frame (perhaps after being absent for one or more frames), are they the same? Associated watermark data for each, such as their x-offsets within a tile, can be checked for correspondence. If they match, they are the same point. If not, then it seems the feature point derives from a similar, but demonstrably different, location in the package artwork.

Relatedly, the enhanced confidence that watermark data provides about matching keypoints enables keypoints to be extracted from content that is generally unsuitable for keypoint extraction, e.g., due to the sparseness or weakness of corners. One example is host content that depicts a foggy or highly Gaussian-smoothed scene. If the content is watermarked, it enables more aggressive extraction of keypoints—allowing retention of keypoints that might otherwise have been discarded for being too low in quality, and thus in reliability. By anchoring each keypoint in the context of the watermark frame of reference, it becomes more reliable. Matching of such keypoints can involve checking consistency with the watermark location in which they are expected to be found. If two keypoint descriptors seem to match, but the reference keypoint is from watermark block 32, and the keypoint extracted from user-captured imagery is in block 67, then the match is spurious and can be disregarded. Again, reference to watermark information can be seen to enhance the utility and reliability of keypoint data.

Just as reference to watermark data can help resolve ambiguity between keypoints, reference to keypoints can help resolve ambiguity between watermark data. Recall the earlier discussion in which watermark blocks are not serialized, per se, but instead block identification proceeds on a relative basis. Block (1,0) is the block to the right of block (0,0), etc. When two different user devices encounter an object (or the same device encounters the object in two different sessions), and each declares a different watermark block to the home block, how are the two coordinate frames reconciled? As indicated, feature points can resolve the ambiguity.

The feature points generated by one device are compared for correspondence with those generated by the other device. If plural pairs of feature point descriptors match (within some threshold), then the camera views of the two devices likely overlap. If a feature point having descriptor 3FD57 . . . is located in watermark block (1,2) of the framework established by the first device, and a feature point having a matching descriptor is located in watermark block (4,3) of the framework established by the second device, then the relationship between these two watermark frameworks is likely thereby established (i.e., block (0,0) in the first device framework corresponds to block (3,1) in the second device framework).

More certainty comes by using more points. Or by considering the watermark-indicated poses of the surfaces that the corresponding feature points lie on. As noted, feature points desirably are associated with data indicating their positions in a watermark-based frame of reference. From distortion of this watermark's known calibration signal components in imagery captured by the first device, the pose of the watermarked surface excerpt relative to the first device camera is indicated. (E.g., the surface may be viewed at a scale of 2.0, with a 35 degree rotation, and with certain x and y offsets.) Similarly, the watermark detected from imagery captured by the second device reveals the pose of the watermark surface as viewed by the second device. (E.g., it may be viewed at a scale of 1.75, with a 10 degree rotation, and with certain x and y offsets.) Given this data, the imagery captured by the second device camera can be transformed to appear as if it were captured from the first device viewpoint. Or vice versa. (Or images captured by the two cameras can be remapped to appear as if viewed from a different, third, viewpoint.) In such remapping of the captured images, to impose a common viewpoint, the paired feature points that are believed to correspond should closely overlap. If they do, this certainly indicates their correct correspondence.

As indicated earlier, distortion of watermark calibration signals in a watermarked image, from such signals' reference states, directly indicates affine transformation of the image from its reference state (e.g., the image has been scaled this much, rotated that much, and shifted this much in x- and y-). Knowing such data, a captured image can be virtually counter-transformed to restore it to back to its reference state. Strictly speaking, affine transformation does not encompass perspective transformation (although in many cases the former is a close approximation of the latter). To more accurately characterize the appearance of an object to a camera, including perspective, a homography transform is commonly employed. This transform takes, as inputs, the x and y coordinates, within two image frames, of four or more pairs of corresponding points, which are understood to lie on a common plane (e.g., a common face of a cereal box). The procedure detailed in the preceding paragraph provides a good way of identifying such corresponding pairs of points. Once corresponding pairs of points are determined, a homography matrix can be established that relates the pose state of the surface depicted in one image, to the pose state of the surface depicted in the other. With each successive frame of captured imagery, the pose state of the surface in the latest frame can be further refined using the homography indicated by corresponding point pairs. Such procedure may employ, as the two initial images, a camera-captured image of the object, and the same image after virtual counter-transformation per the watermark-indicated affine transformation to restore it to its reference state (i.e., at zero rotation, 100% scale, etc.). Re-syncing the homography-indicated pose of the object to the watermark-indicated object pose can be performed by repeating the just-noted procedure periodically, or occasionally, during a video stream of image frames.

If an augmentation has not been previously-scripted for an item, then a default augmentation can be presented, e.g., in the form of data from Wikipedia or a nutritional database, rendered in a form template. (Such data sources can be searched using the GTIN, or a product name obtained from a GTIN database.) The augmentation can be anchored at a default position, e.g., with a lower right corner coincident with a lower right corner of the product face being viewed by the smartphone, and can have a default height of half the item height. The initial AR content may be overlaid simply according to rotation and scale information from the watermark decode using the virtual (0,0) block as a centering anchor location. Alternatively, no AR experience may be vended (provided) until the accumulated feature points and/or watermark array determine an object description sufficient to anchor the AR content against, depending on the application needs or implementer desires.

The average supermarket stocks more than 40,000 different items. Gathering feature point data for such products—if left to the different manufacturers—would be an enormous undertaking. The process would likely be complicated by debates about disparate feature points and descriptors, data formats, repositories, etc., by the different parties involved. The present arrangement, in contrast, allows this bedlam and babel to be shortcut, with feature point information for popular products to be gleaned quickly, and feature point information for less popular products to be gathered in short order.

Related to the foregoing is use of a watermark's reference signals to weed out and come to consensus about minimally-variant surfaces through time, using repeated watermark detections as a basis for Euclidean space correlation.

For example, when a phone detects a watermark from an image frame depicting the front face of an object, such as a cereal box, the parameters discerned from the watermark calibration signal enable the phone to estimate a virtual, infinite grid of watermark blocks, along the correct perspective and with a definite scale. Out of that same frame, feature points are extracted and then tracked across subsequent frames. As the image in subsequent frames moves, new feature points are extracted and correlated to previous points, and existing points are refined. These points are placed virtually within the grid of watermark blocks, and so continually enhance the understanding of the surface in front of the camera. As new watermark reads occur (which may be every Nth frame), the current estimate about the surface is successively refined. Some feature points are found to be highly consistent (reliable), while others are not. Again, a figure of merit can be associated with each.

Thus, it will be seen that the watermark data is used to determine the homography on which the feature points lie.

If feature point tracking is lost, or if subsequent watermark detection yields significantly different perspective or translation than is expected (or watermark detection yields a different payload than the last payload), then recently extracted feature points with the lowest confidence (highest error) are discarded, and the device goes back into search mode.

Figure 16A:
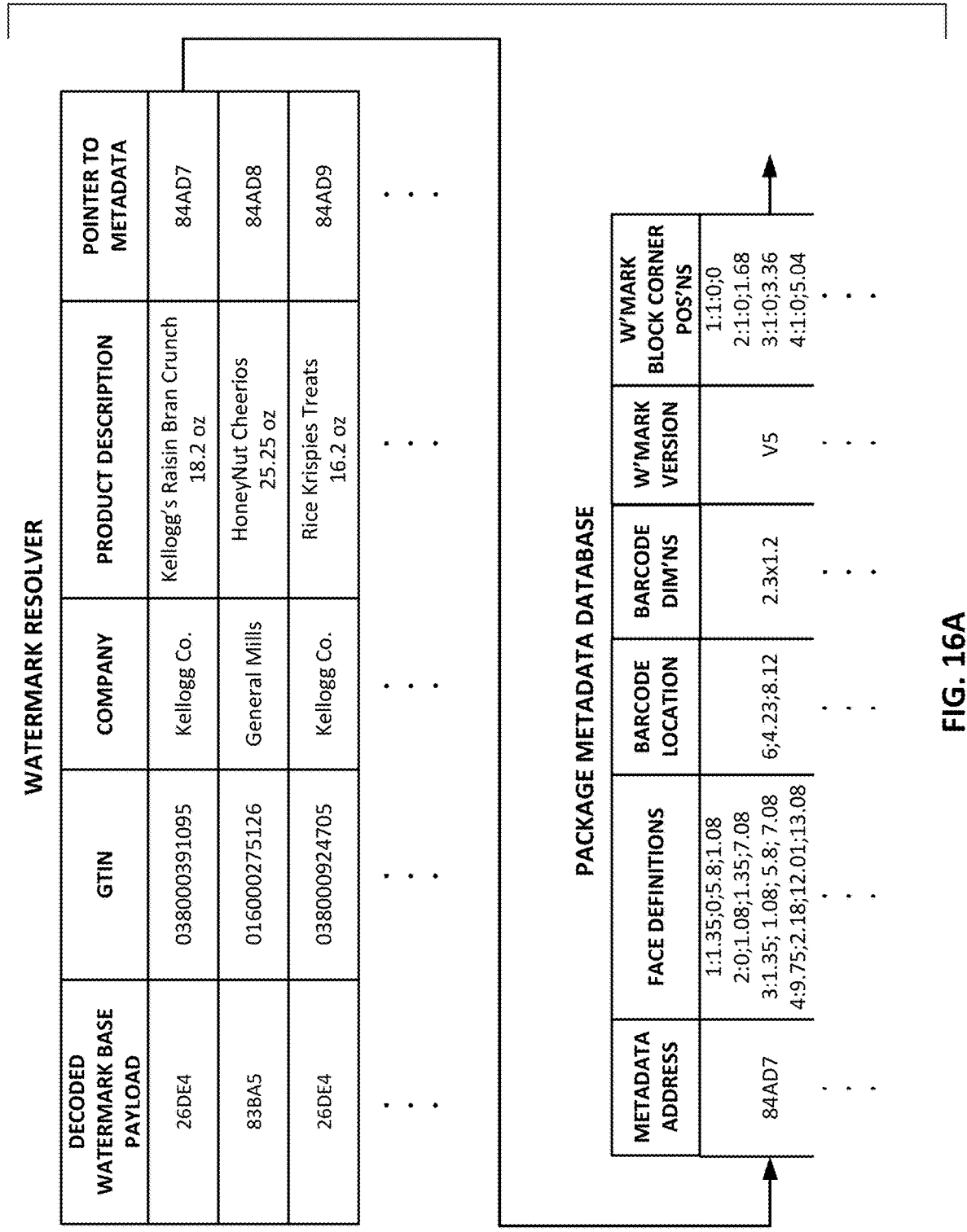
FIGS. 16A and 16B illustrate an illustrative data structure suitable for use in certain embodiments of the present technology.
Figure 16B:

FIGS. 16A and 16B conceptually illustrate data structures that may be used in an illustrative embodiment employing aspects of the present technology. At the top of FIG. 16A is data associated with a watermark resolver aspect of operation. A decoded watermark payload is shown in the left column. The next column is the GTIN to which that payload corresponds. The next two columns specify a name of the product, and provide a short description. The final column is a pointer to a metadata structure, shown beneath.

In operation of this system, a camera-equipped device decodes a watermark printed on an object, and sends it across a local network (or the internet) to the data structure of FIG. 16A to determine the GTIN of that object, together with the product name and description. Such object data is returned to the originating device across the network. In other embodiments, the watermark payload is the GTIN itself, so the originating device does not need network connectivity to learn the object GTIN. (The other data is typically stored in a data structure, and is not literally encoded in the watermark payload.)

The metadata shown at the bottom of FIG. 16A may form part of the same data structure as the top part, or the two may be distinct. The metadata information provides additional information associated with the watermarked object (here a box of Kellogg's Raisin Bran Crunch cereal). The detailed data generally specifies the relationship between the watermark blocks and features of the package.

For example, the second column identifies the locations of the six package faces (FIG. 12) by the watermark block coordinates for their upper left and lower right corners. This coordinate data is here expressed in units of watermark width (which can readily be converted to watermark block number and x-/y-waxel offset within that watermark block). So FIG. 16A indicates the upper left corner of Face 1 is at coordinates 1.35 (x) and 0 (y). (As shown in the upper left corner of FIG. 12, the coordinate axes have their origin at the upper left of the package blank, and all values to the right, and down, are positive.) The lower right corner of Face 1 is at coordinates 5.8 and 1.08. The other five faces are defined in similar fashion.

Metadata in the FIG. 16A table also specifies the location of the conventional rectangular barcode on the box. (Or locations, if there are more than one.) In the depicted table, this location is specified using three data: the face on which the barcode appears (here, face #6), and the x- and y-coordinates of the upper left corner of the barcode. The width and height dimensions of the barcode are also given (the specified 2.3 and 1.2 are in units of inches, but other units—such as watermark blocks or waxels—can naturally be used).

Next in FIG. 16A is specification of the watermark format or protocol. This parameter may be omitted if only one watermark version will ever be encountered in this application.

FIG. 16A concludes with specification of the corner locations of each of the tiled watermark blocks. The block number is indicated, followed by two coordinates for the block's upper left hand corner. These latter data are specified in units of inches—allowing coordinates that are specified for other features in terms of watermark blocks, or waxels, to readily be converted to inch units.

The metadata table of FIG. 16A continues in FIG. 16B. For each watermark block in the artwork, this table indicates the keypoints included in such block—together with its location.

Blocks are identified in a two-part format, e.g., 26DE4-1. The first data, 26DE4, is the payload of the watermark block. The second data, 1, is the block number in the tiled array.

The data in the second column of FIG. 16B gives the keypoint data. An illustrative form of data is the 128 element vector characterizing a SIFT keypoint. The location of the keypoint, within the specified block (e.g., block 1) is given by the two numbers before the keypoint descriptor, e.g., {51.5, 12}. These are the offsets of the keypoint, in waxels, from the upper left corner of the watermark block.

(Of course, the choice of keypoints, and the form of their descriptors, is left to the system designer. Many AR systems employ the "FAST" (Features from Accelerated Segment Test) method of finding corner keypoints, as they are very simple to compute, and thus lend themselves to real-time operation, such as tracking keypoints across frames at high frame-rates (e.g., 30-100 frames per second). FAST keypoints are described, e.g., in Rosten, et al, Fusing points and lines for high performance tracking, 10.sup.th IEEE Int'l Conf. on Computer Vision, 2005, pp. 1508-1515, and Rosten, et al, Machine learning for high-speed corner detection, 2007 European Conference on Computer Vision, pp. 430-43, both of which are attached to incorporated-by-reference application 62/487,678 and form part of this specification.)

SIFT

A brief review of SIFT feature points is included here for readers who may not be skilled in such art.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch, and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints of different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with a 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is typically applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used— identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Patent application WO07/130688 concerns a cell phone-based implementation of SIFT, in which the local descriptor features are extracted by the cell phone processor, and transmitted to a remote database for matching against a reference library.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, IEEE Transactions on Pattern Analysis and Machine Intelligence, Vol. 34, No. 7, pp. 1281-1298; Calonder, et al, BRIEF: Binary Robust Independent Elementary Features, ECCV 2010; and Rublee et al, ORB: an efficient alternative to SIFT or SURF, ICCV 2011.

ORB, like the other noted feature detection techniques, is implemented in the popular OpenCV software library (e.g., version 3.3).

Further Details

Particular arrangements employing certain features of the present technology are described in the following section. Some of these arrangements employ the visible graphical AR markers used by Zappar, Ltd.—commonly known as Zapcode markers, and Zappar's associated recognition and response software.

Figure 17A:
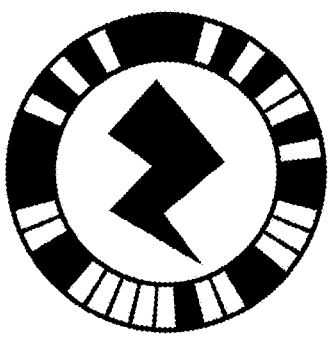
FIGS. 17A, 17B and 17C depict different Zapcode markers.
Figure 17B:
Figure 17C:
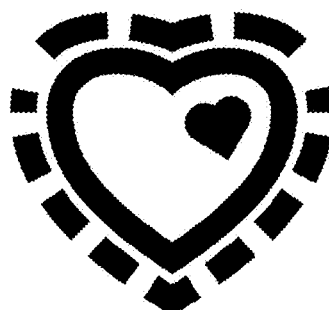

Illustrative Zapcode markers are shown in FIGS. 17A-C. The hash marks around the periphery convey a data payload. The symmetrical outline shape, together with the graphic in the interior (lightning bolt, face, heart) help the Zappar software locate the Zapcode marking in graphical content, and to determine its orientation, so that the payload data can be properly decoded.

Zappar markers are widely used in graphical content. Exemplary content includes packaging for foods and soft drinks, books and magazines, toys, and web pages.

When the Zappar software on a user's smartphone decodes the marker payload, it sends the decoded payload to a data structure (often remote from the user device), and downloads corresponding reference data including keypoint descriptors and AR overlay graphic data. The reference descriptors may describe corner features of the Zapcode marker, but also describe corner features of the surrounding host content—such as other artwork on the product package, magazine page, etc. The Zappar software extracts keypoints from the user-captured imagery, and attempts to match them to the reference keypoints just downloaded to the phone. If a suitable number of keypoints match, the software overlays the AR graphic (which may be an animated rendering of a 3D shape) on the captured imagery—scaled, oriented (in tip, tilt and yaw, for a 3D graphic) and anchored relative to the matching keypoints.

If the user points the camera away from the Zapcode, the augmentation continues to track the features in the host content, through continued matching of keypoints between the downloaded reference data and the further image frames. If the user points the camera away from the host content for which reference keypoint descriptors were provided, rendering of the augmentation commonly continues—typically presented at the middle of the smartphone screen, on top of whatever imagery the camera is then providing. If the camera is thereafter pointed back to the original content, the augmentation snaps back to the authored position relative to the keypoints. (Authoring of the AR experience is performed by a designer using Zappar's Zapworks suite of software.)

In an illustrative example, host content (e.g., a cereal box) is printed with a Zapcode marker on its front face, and all surfaces are encoded with watermark data. Each watermark block encodes a first payload field identifying the object (e.g., a GTIN), and a second payload field identifying the block number. (Alternatively, as discussed elsewhere, the block numbering can be inferential rather than express.)

Figure 18:
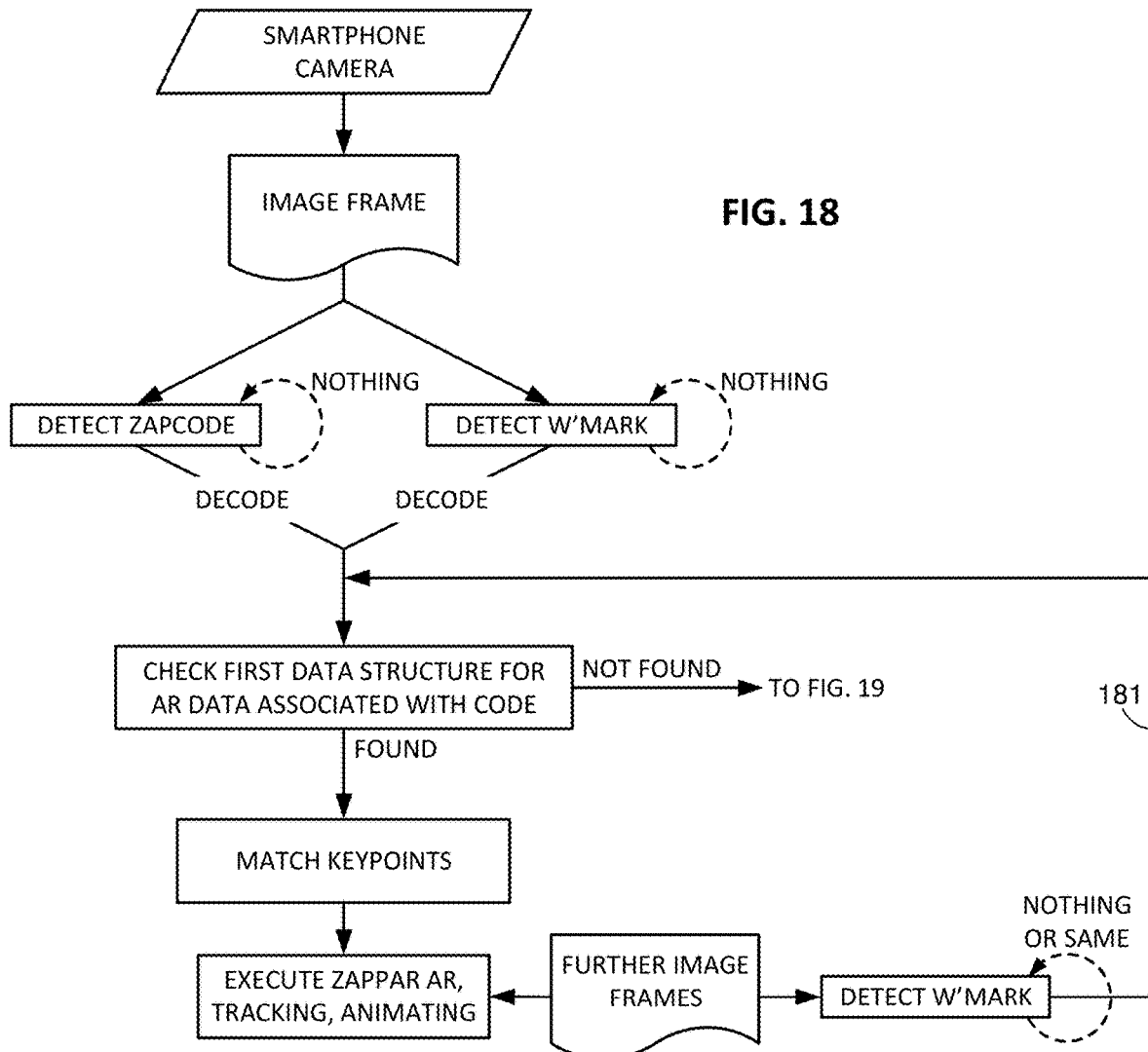
FIGS. 18 and 19 show flow charts depicting sample methods according to aspects of the present technology.

FIG. 18 shows how this watermark information is used in conjunction with the Zapcode information. A smartphone camera provides frames of imagery to both a Zapcode detector and a watermark decoder. Each examines incoming frames until the former detects a Zapcode marker, or the latter detects a watermark. The payload from the marker/watermark is decoded, and sent to a first data structure to determine if corresponding AR data is available.

If the first data structure has AR data corresponding to the decoded payload, it is downloaded to the phone for use by the Zappar rendering software. The smartphone then executes the rendering software, causing the augmentation associated with that payload to be presented on the screen. (The downloaded reference data desirably has coordinate data for each of the reference keypoints, in an authoring frame of reference. The rendering software can then determine a homography between that reference frame, and the camera-captured image frame, permitting the augmentation graphic to be positioned, oriented and scaled appropriately to the camera viewpoint.)

As each further image frame is provided by the camera, the Zappar software analyzes it for keypoints matching those in the downloaded reference data. The augmentation's placement on the display, as well as its size and orientation, are adjusted as necessary—tracking the homography indicted by the matching keypoints. Meanwhile, these further image frames are also submitted for watermark decoding. (Every frame can be submitted for watermark decoding, or only every Nth frame, such as every fifth or twentieth frame.) No action is triggered, so long as the payload earlier-detected is still-detected, or if no payload is detected. However, if a watermark payload is detected that is different than the watermark payload formerly detected (or if a watermark payload is detected for the first time), then the software loops back (181) to determine whether there is AR reference data in the first data structure that is associated with the newly-detected watermark payload—and whether that reference data is different than the reference data presently being used. If so, this different reference data is downloaded to the phone, and rendering thereafter proceeds using this different reference data.

It will be recognized that this watermark aspect of operation enhances operation of the Zappar system. Consider the Raisin Bran cereal box of FIG. 2A. It is not a planar object, but rather a 3D object with six faces. Different augmentations may be appropriate for different faces. For example, the front face may be augmented with an animated sun character, while a side panel (with nutritional labeling) may be augmented with a display of expanded nutritional facts.

When the user points the camera to capture imagery of just the front face, a Zapcode marker (not shown in FIG. 2A), or a watermark block, is decoded, and the decoded payload data causes reference data for the sun augmentation to be downloaded from the first data structure, and rendered on the phone screen. If the user moves the camera a bit, a different watermark block on the front face may be decoded, e.g., with the second field of the watermark payload switching from indicating block 64 to indicating block 65. This newly decoded payload causes the software to check the first data structure to see if different reference data should be downloaded. In this instance, since both blocks 64 and 65 are on the front face, no different reference data may be indicated.

If the user continues to move the camera, or turns the box, the captured frames begin to depict more and more of the side panel. Fewer and fewer of the keypoints extracted from the camera imagery match the earlier-downloaded reference keypoint data. (The Zappar software assumes that all the keypoints lie on a common plane.) The side panel may initially be viewed at a very oblique angle, but eventually is viewed at a more normal orientation (e.g., with a surface normal from the side panel being oriented within 30 degrees of the camera axis). During this transition, the software will detect a watermark payload from a block on the side of the box, such as block 43 in FIG. 3. (A preferred watermark detector first analyzes the middle of the camera frame first for decodable watermark data. If no decodable watermark is found, it next examines the frame location where a watermark block was most recently-found, if different from the middle of the frame. If that fails, the detector next examines successively more peripheral portions of the frame. These operations may all be performed on a single frame, but due to processing constraints are more commonly performed on a series of frames, with one or more of these location tried in each frame, eventually cycling back to examining the middle.)

Again, detection of a new payload causes the software to check the first data structure. Submitting the payload data indicating block 43, the smartphone finds that there is different AR reference data available. This data is downloaded to the phone. Keypoints extracted from the camera data are matched against the newly-downloaded reference data, and a new augmentation—presenting the expanded nutritional facts—is presented on the screen, geometrically registered to features on the side panel.

Thus, as the user turns the 3D object, new augmentations appear, as new features of the object are brought into the camera view.

Without this watermark capability, a cereal box would require an overt marker on each of its faces, to permit different augmentations to be presented. Moreover, as the box is turned to expose a new face, no new augmentation would be presented until the overt marker on the new face is fully brought into the camera's field of view. The just-described arrangement overcomes these shortcomings.

In a related embodiment, when a payload is decoded from a watermark or marker, and is sent to the first data structure as a query, the data structure responds with not one, but several different sets of reference AR data. The set first may define a first augmentation, relating to a first set of keypoints, found on a first face of the object. The second set may define a second augmentation, relating to a second set of keypoints, found on a second face of the object. Etc. Different sets of reference augmentation data may thus be cached for immediate use, not only for different faces of the object, but also for different host content the user might soon encounter—such as subsequent pages of a magazine or book.

The rendering software loads the first augmentation, and overlays it on the camera imagery based on correspondence with the first set of reference keypoints. If, at some point, the camera-captured images no longer match the first set of reference keypoints, the smartphone does not simply render the augmentation in the middle of the screen at the last-set scale and orientation. Rather, the software tries matching against the second and subsequent sets of reference keypoints, to attempt to find another corresponding augmentation, without having to decode any further payload data, nor communicate again with the data structure. It may find, for example, that the third set of reference keypoints now matches the camera imagery. The software quickly presents the augmentation associated with this third set of reference keypoints (e.g., an expanded nutrition facts graphic), and overlays it in geometrically registered alignment with feature points on a side panel of the cereal box.

By such arrangement, different augmentations are again seamlessly presented as a user moves the camera, or the object, to reveal different faces.

The reference augmentation data for a particular object surface may be accessed in the first data structure using two different payloads: one for the Zapcode marker, and one for the watermark. For example, the data structure may have two index fields, to permit either form of payload data for the object surface to be input, and the reference data for that object to be output. In some embodiments, a second, resolver, data structure may be used, e.g., taking the watermark payload for an object as input, and outputting a corresponding Zapcode marker payload (or vice versa). This output data can then be provided to the first data structure to obtain the corresponding reference AR data. (In one such embodiment, the data structure of FIGS. 16A/16B is expanded to include as metadata, for a given watermark payload, corresponding Zapcode marker payload data.)

Thousands of supermarket items are presently distributed in watermarked packaging. A further aspect of the present technology enables consumers to author their own augmentations for such objects—even though the packaging may lack Zapcode or other overt AR markers.

Figure 19:
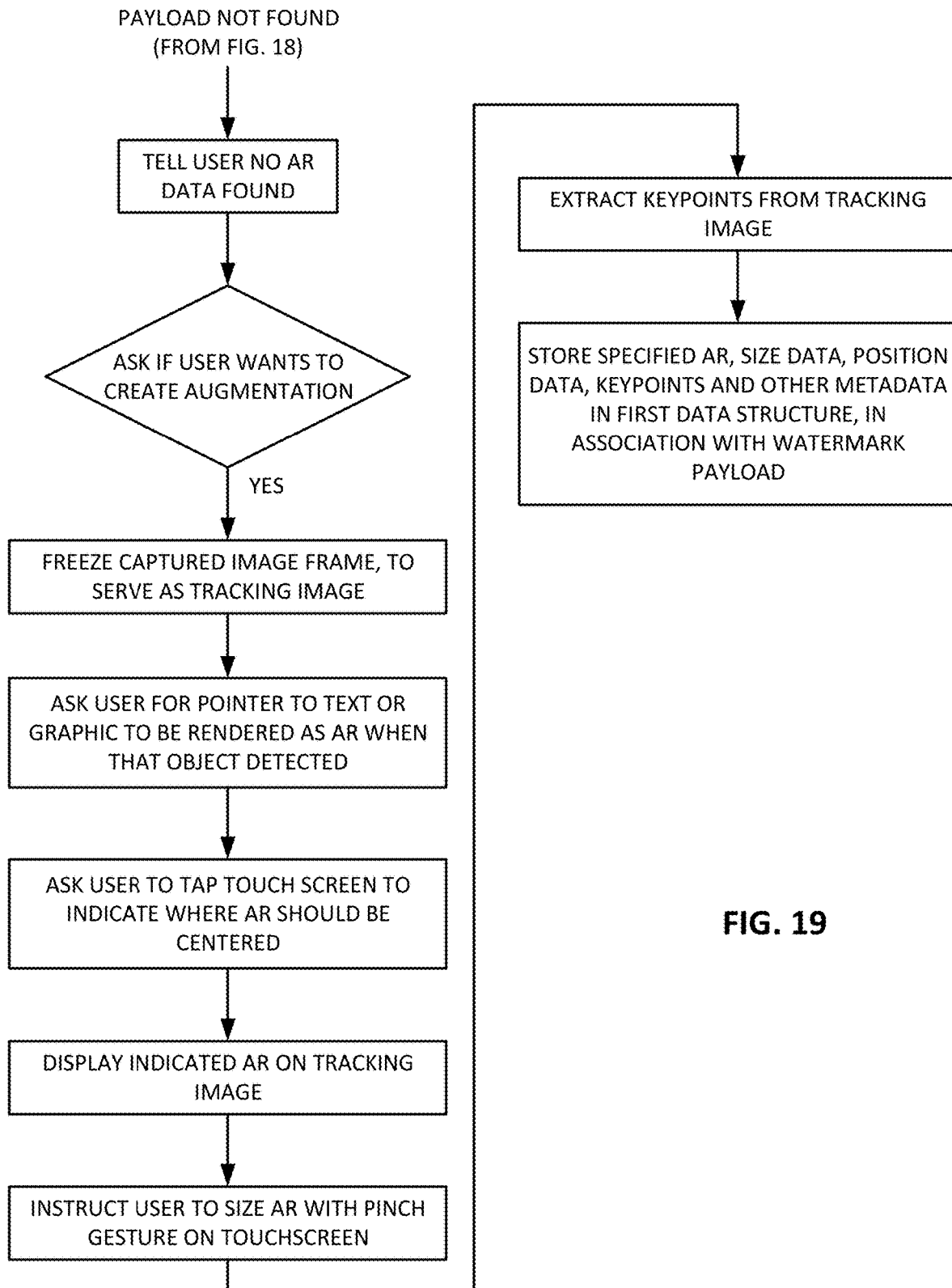

In accordance with one aspect of this technology, when a watermark payload is detected from an object, but no corresponding AR data is found in the first data structure, the process proceeds from FIG. 18 to that shown in FIG. 19.

This process starts by the phone software displaying a message indicating that no augmentation is known for the imaged object, and inquiring if the user wants to create an augmentation. If so, an image frame from the streaming output of the camera is frozen, providing a static tracking image on which to work. (The software may examine several recently-captured and—buffered images, to select one for use, based on high local contrast and/or other quality metrics.)

The user is next prompted to provide a pointer to text or a graphic that is to be rendered when that object is next detected. The pointer can indicate a file location on the user's computer, or an address on a remote computer (e.g., the web). In some implementations, the user is given the choice to invoke an authoring program, allowing text or graphics to be user-created.

The software next prompts the user to tap the location, on the frozen tracking image, at which the augmentation should be centered. The location of this tap is sensed with the phone's touchscreen UI.

The user-specified augmentation is then accessed from its stored location, and overlaid on the tracking image, at the location indicated by the user's tap. The user can use touchscreen gestures to drag or nudge the augmentation to move its location from this starting point. The user is also instructed to size and orient the augmentation, using two-finger gestures such as are supported by the iOS operating system for iPhone devices.

The software next extracts keypoints from the tracking image. These data, together with the specified AR, and data indicating its desired size, orientation and position, are then sent to the first data structure for storage, in association with the watermark payload. Other metadata may be included as well, such as data indicating the author, and an augmentation title.

Thereafter, when a user device decodes that watermark payload, the just-defined augmentation data is provided to that user's device for rendering.

In a different arrangement, multiple augmentations may exist for a single object. That is, when a user device decodes a payload, and the payload is sent to the first data structure, the data structure may respond with information indicating there are many augmentations to choose from. These may be listed on the device screen for user selection, e.g., by author and title. Listed first may be an augmentation defined by the proprietor of the product (e.g., The Kellogg Company, for Raisin Bran cereal). Listed beneath may be several user-defined augmentations, ranked based on consumer feedback, such as the number of "Likes" each receives. The presented list can also include an option enabling the current user to define a new augmentation for the object, per the FIG. 19 procedure, despite the fact that other augmentations are already associated with that object. Some implementations allow a second user to modify an augmentation earlier defined by a first user, creating a new, forked, augmentation.

Whenever an augmentation is rendered to a user, the user can be given the opportunity to "Like" that augmentation. Resultant tally data, indicating a cumulative number of Likes, can be stored with the augmentation data in the first data structure, and later serve to define each augmentation's position in a ranked list.

In a different arrangement, if a user captures imagery of an object bearing a watermark, and no corresponding AR reference data is found in the first data structure, the data structure replies with an error code to the user's device. Software on the user's device responds to this error code by checking a second data structure for a web page address corresponding to the payload. The second data structure may be like the table of FIG. 16A/16B, but with a field associating a URL with the watermark payload. For the Raisin Bran Crunch cereal box shown in FIG. 2A, this URL may be the Kellogg's web page devoted to this product, i.e. www<dot>kelloggs<dot>com/en_US/products/kellogg-s-raisin-bran-crunch-cereal-product.html. (The <dot>convention is used to prevent this text from acting as a browser-executable instruction, as required by Patent Office Manual of Patent Examining Procedure § 608.1(VII).) By such arrangement, if a user seeks to interact with an object, and no corresponding augmentation is available, a corresponding web page is served to the user instead.

(It will be recognized that data structures described as unitary may be implemented by several different portions, sometimes distributed on different devices. Likewise, it will be recognized that different data structures, e.g., first and second data structures, may be implemented by a single data structure.)

CONCLUDING REMARKS

Having described and illustrated the technology by reference to various particular embodiments, it should be recognized that the invention is not limited to such arrangements.

The present description generally refers to the camera-equipped device (e.g., phone) as being moved relative to the object. Movement of the object, instead, is naturally equivalent.

In embodiments employing crowd-sourced acquisition of data, in situations where watermark blocks are not serialized, there is the matter of which "home" block should be used. In one embodiment, it is the first smartphone to analyze an item that gets to declare which block is the home block. That first smartphone reports a first set of feature point data in a frame of reference based on that block. When a second smartphone reports a second set of feature point data, it may initially be defined by reference to a different home block (i.e., the one first found by the second smartphone). However, by matching feature points between the two data sets, the correspondence between the two phones' frames of reference can be determined. For example, feature point matching may indicate that the home block in the first data set corresponds to block (2,1) in the second data set. In this case, all feature point references in the second data set are changed by subtracting a block offset of (2,1) to reconcile the two block-based frames of reference.

Reference was made to "some" of the frame of imagery captured by the smartphone being processed for extraction of reference feature points. Less than all of the captured imagery might be used in cases where the camera-captured imagery depicts more than the item of interest. In some embodiments, the image frame is analyzed for a straight edge that extends from one edge of the frame to another edge. This edge may be assumed to be the edge of the item (e.g., cereal box). If such an edge is found, points on the far side, relative to the decoded watermark block, may be disregarded, as they may be assumed to correspond to background clutter—not the box.

Additionally, use may be made anterior to the initial feature-point extraction of relative movement of the feature points through time. If the reference feature points do not move together as the user moves the phone camera through space, but instead move in e.g. two groups, then one group of feature points can be deduced to be representing an object, and the other the background. Various other groupings of feature points could be made as the initially determined points move relative to each other through time. Correlated with placement in the camera frame of the initial watermark decode, the application could relatively easily determine which feature points can be discarded, and which be used for continued tracking. This system could also be used for just-in-time expansion and update of initially extracted feature points, to expand the group of points as long as new additions continue to move relative to the already-sensed group.

While the technology has been described, generally, as a single user AR experience, it should be recognized that information about watermarks, feature points, etc., can be shared between two or more devices, by which an augmented reality experience involving multiple cooperating users can be implemented.

Although the detailed embodiments made use of watermark technology and/or overt markers (e.g., Zapcode markers) to identify an object, one or both of these may be omitted. An object may be recognized by its inherent appearance, rather than by detection of added, encoded, data. For example, the Raisin Bran box of FIG. 2A may be recognized by keypoints extracted from imagery alone—with such keypoints being compared against a library of different collections of reference keypoints—one collection for each of thousands or more of different items. When the extracted keypoints match keypoints in one of these reference collections, to an improbably high degree for it to be random, the imaged object can be identified as the object to which the reference keypoints belong. (Such identification sometimes goes by the name "image fingerprinting." SIFT, SURF, ORB and FAST are some of the keypoint extraction methods that may be used for such purpose.)

Similarly, an object can be recognized by its inherent appearance using a deep neural network that has been trained, using a large collection of reference images depicting known objects, to respond when an image of one of these objects is newly presented. Such technology is detailed, e.g., in Krizhevsky, et al, ImageNet classification with deep convolutional neural networks, Advances in Neural Information Processing Systems, 2012, pp. 1097-1105, and Szegedy, et al, Going deeper with convolutions, Proc. IEEE Conf. on Computer Vision and Pattern Recognition, 2015, pp. 1-9. Additional information is detailed in applicant's copending application Ser. No. 15/726,290, filed Oct. 5, 2017. These documents are incorporated herein by reference.

Once an object is recognized—regardless of the means employed—corresponding reference data can be identified in a data structure, and used to provide an augmentation as described above.

Moreover, while matching of keypoints between a reference set of data and camera-captured imagery (feature tracking), is most commonly used to establish the viewpoint of the camera (sometimes termed the pose of the object), other means can be employed. Closely related is the science of structure from motion, which enables 3D structures to be estimated by pointwise correspondence between plural 2D images. Another is to use a depth sensing camera, which associates a distance measure with each of plural sampled points across the image frame. From such data, the pose of the object can readily be determined, and the augmentation graphic or animation can be geometrically transformed to correspond to that object pose. Examples of depth sensing cameras include the Intel RealSense camera, and Qualcomm's Spectra depth sensor.

While reference was made to feature point descriptors, some embodiments employ locality-preserving hashes of such descriptors Although watermark decoding is described as being performed on the smartphone, this is naturally illustrative. Watermark decoding (including determining object pose from watermark calibration signals) can be done by a remote processor, or distributed between devices. In like fashion, the other detailed processing—such as feature point extraction, feature point matching, feature point tracking, etc.—can be performed remotely from the smartphone, or in distributed fashion, if desired.

Thus, for example, in the crowd-sourced arrangement detailed above, a device that acquires the imagery (e.g., a smartphone) does not, itself, need to process the imagery to determine pose or extract feature points. Instead, it can send the captured imagery (or derivatives, such as a filtered or compressed counterpart) to a remote server, which performs one or both of these acts. The remote server can, in turn, return associated data back to the originating device.

Naturally, the technology isn't limited to smartphones. Any other computing system can be used, including a headworn or vehicular apparatus, or a computer system of any other form factor. (In smartphone-based implementations, a suitable smartphone is the Apple iPhone 7 phone.

Figure 20:
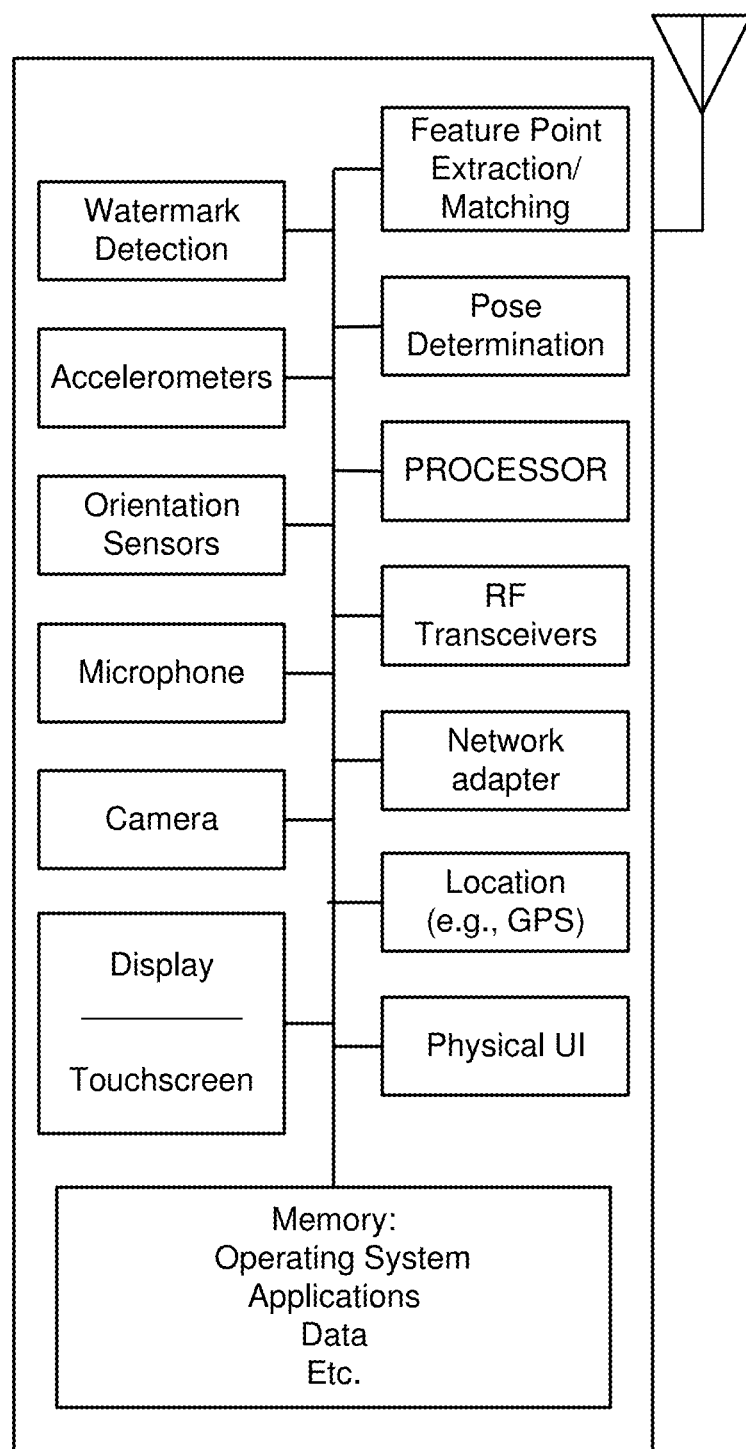
FIG. 20 is a block diagram of an illustrative smartphone that can be used in embodiments of the present technology.

FIG. 20 shows a block diagram of a smartphone, including modules to perform the watermark- and feature point-related operations detailed herein.)

In addition to the noted Zapworks suite of software for authoring augmentations, another suitable platform is the Unity game development engine, by Unity Technologies.

Details concerning watermarking are known from applicant's previous patent filings, including U.S. Pat. Nos. 6,424,725, 6,590,996, 6,975,744, 6,975,745, 20140052555, and WO/2017/011801. Such watermarks are commonly imperceptible, meaning they are not noticeable to a viewer examining watermarked objects from a typical viewing distance (e.g., 20 inches) under typical retail lighting (e.g., 75-100 foot-candles). When formed on media without artwork (e.g., white labels), watermarks may take the form of a perceptible sparse scattering of dots, giving a subtle tint to the medium. Such an arrangement is detailed in patent publications 20170024840 and 20160275639, and application 62/634,898, filed Feb. 25, 2018.

Applicant's other patent documents that relate to the present technology (some of which further detail watermarking) include 20100261465 (e.g., re presenting an AR overlay in accordance with watermark information), 20150016712 (e.g., re recognition of 3D objects, including views from different perspectives), 20140304122 (e.g., re triggering presentation of AR graphics when supermarket items are recognized), 20140119593 (e.g., re estimating pose based on multiple frames of feature point depictions, and distinguishing watermark blocks with local fingerprints), 20140320021 (e.g., re defining a template payoff that can be presented when an object is identified for which a payoff has not previously been scripted), 20160189381 (e.g., re pose estimation and structure from motion) and 20150016688 (e.g., re determining keypoints by which graphical augmentations can be presented, by reference to watermark information).

Details about augmented reality, generally, are presumed to be familiar to the reader, and thus aren't belabored here. Those who are less familiar with such technology are referred to exemplary patent literature published by vendors of AR technology, such as:

For Aurasma (now part of Hewlett-Packard): 20120203799, 20140225924, 20140253743, 20150347851 and 9,594,942.

For Qualcomm Vuforia (now part of PTC): 20100002909, 20110310227, 20120075433, 20130136300, 20130177203, 20130342573, 20140126769, 20150092061, 20150062120 and 20170091943.

For Metaio (now part of Apple): 20050275722, 20070146391. 20070182739, 20100232727, 20100287511, 20110090343, 20110280445, 20120120199, 20120176410, 20120219188 and 20140321705.

Other third party documents relevant to the present technology include 8,422,777 (which concerns detailing camera-object pose by reference to appearance of a known object) and 20060233423 (which similarly concerns discerning camera-object pose by reference to keypoints).

The excerpt from the thesis by Klein, "Visual Tracking for Augmented Reality," University of Cambridge, 2006 (i.e., spanning the beginning through Chapter 4, with Appendices B-D and Bibliography), which forms part of related application 62/487,678, details exemplary arrangements for visual tracking and pose determination. The paper by Kato, Marker Tracking and HMD Calibration for a Video-Based Augmented Reality Conferencing System, IWAR 1999, which also forms part of related application 62/487,678, is a simpler exposition on the same topic.

The algorithms detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of extracting keypoints, or decoding a watermark—involves first defining the sequence of algorithm operations in a high level computer language, such as MatLab or C++(sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform keypoint extraction, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for extracting keypoints, or decoding a watermark, begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the size of the expected watermark block can be defined by parameters stored in a re-writable memory. By such arrangement, the same ASIC may be incorporated into two disparate devices, which employ watermark blocks of different sizes. One may be a smartphone for reading watermark-encoded product identifiers hidden in grocery item packaging—which looks for a watermark block of a first size. A second may be an age verification terminal (e.g., at a liquor store) for reading watermark-encoded birthdate information hidden in a driver's license—which looks for watermark blocks of a second, different size. The chips are all identically produced in a single semiconductor fab, but are differentiated in their end-use by different block size data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASH' may be designed to include native instructions that serve operations associated with some or all of: keypoint extraction, keypoint matching, keypoint tracking, detecting watermark calibration signals, etc. However, such native instruction set would lack certain of the instructions available in more general purpose microprocessors.

Reconfigurable hardware and ASH' arrangements are further detailed in application Ser. No. 14/842,575, filed Sep. 1, 2015 (now published as 20170004597), the disclosure of which is incorporated herein by reference.

A particularly preferred mobile implementation employs an Apple iPhone device, running the iOS 11 or later operating system, in which the image processing operations are performed on the device GPU, using the Metal 2 API and the Vision framework, where a common memory serves both the device GPU and CPU. Any machine learning aspects, e.g., for object recognition, are implemented with Apple's Core ML framework.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a user's smartphone) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A method comprising the acts:
receiving a first set of feature point data for a first object, said first set of feature point data having been produced from first imagery of said first object captured by a first mobile device at a first location;
receiving a second set of feature point data for a second object, said second set of feature point data having been produced from second imagery of said second object captured by a second mobile device at a second location different than the first location, the first and second objects being distinct objects but both being objects of a first type; and
generating an enhanced set of feature point data for objects of said first type, said generating including discarding a feature point included in one of said sets that does not match a feature point included in the other of said sets;
wherein said enhanced set of feature point data is generated from imagery captured by two different mobile devices at two different locations from two distinct objects.

2. The method of claim 1 in which the first and second imagery were captured by the first and second mobile devices in first and second different supermarkets, respectively.

3. The method of claim 1 in which the object is a printed cereal box.

4. The method of claim 1 in which the first imagery of said object includes a first glare spot not included in the second imagery of said object.

5. The method of claim 1 in which the first imagery of said object is captured from a different viewing angle than the second imagery of said object.

6. The method of claim 1 in which the first imagery depicts a first instance of said object, and the second imagery depicts a second, different instance of said object.

7. The method of claim 6 in which the first instance of said object was printed by a printing vendor different than the second instance of said object.

8. The method of claim 1 that further includes receiving additional sets of feature point data for said object, said additional sets of feature point data having been produced from additional imagery of said object captured by additional devices.

9. The method of claim 1 that further includes the first mobile device producing the first set of feature point data.

10. The method of claim 1 that further includes overlaying an augmentation on imagery captured by a mobile device, on a screen of said mobile device, wherein a position of said augmentation on the screen is dependent on said enhanced set of feature point data.

11. The method of claim 1 in which the object of the first type comprises a food or beverage product, a book, a magazine, or a toy.

12. The method of claim 1 in which the first and second imagery depict said objects captured with three or more attributes from the list: (a) different cameras, (b) different lighting conditions, (c) different glare spots, (d) different viewing angles, (e) different times of day, (f) different press runs of artwork printed on said objects, and (g) different regions of said objects being imaged.

13. The method of claim 12 in which the first and second imagery depict said objects captured with five or more attributes from said list.

14. A method comprising the acts:

extracting first watermark information from one or more frames of imagery captured by a camera-equipped mobile device, the imagery depicting a watermarked subject;

identifying the subject as a first subject, by use of the extracted watermark information;

determining initial pose data, characterizing pose of the subject relative to the mobile device, using the extracted first watermark information;

extracting feature point data from additional frames of captured imagery;

tracking a movement of the mobile device, from a state corresponding to said determined initial pose data, based on said extracted feature point data;

losing track of the mobile device movement;

after said losing track, extracting second watermark information from one or more other frames of imagery captured by the camera-equipped mobile device;

confirming, by use of the extracted second watermark information, that a subject depicted in said other frames of imagery is also said first subject; and resuming tracking movement of the mobile device by reference to feature point data extracted from said other frames.

15. A method comprising the acts:

capturing imagery of an object, the object including first and second watermark blocks formed thereon, the captured imagery depicting the first watermark block but not depicting the second watermark block;

identifying the object based on information decoded from the first watermark block;

from data in a memory, determining that an augmented reality graphic should be presented in conjunction with the captured imagery of the object, the graphic being anchored to a location in the second watermark block; and presenting a portion of the augmented reality graphic that should extend into the captured imagery, in conjunction with the captured imagery, despite the anchor location being in the second watermark block that is not depicted in the captured imagery.

16. A method comprising the acts:

receiving a first set of feature point data for an object, said first set of feature point data having been produced from first imagery of said object captured by a first mobile device under a first lighting condition;

receiving a second set of feature point data for said object, said second set of feature point data having been produced from second imagery of said object captured by a second mobile device under a second lighting condition;

receiving additional sets of feature point data for said object, said additional sets of feature point data having been produced from additional imagery of said object captured by additional devices; and generating an enhanced set of feature point data for said object, said generating including discarding a feature point included in one of said sets that does not match a feature point included in another of said sets;

wherein said generating further includes generating a consensus descriptor for a feature point based on said sets of feature point data.

17. The method of claim 16 in which said generating a consensus descriptor includes determining a centroid of multi-dimensional feature point data produced for a feature point.

18. A method comprising the acts:

receiving a first set of feature point data for an object, said first set of feature point data having been produced from first imagery of said object captured by a first mobile device under a first lighting condition;

receiving a second set of feature point data for said object, said second set of feature point data having been produced from second imagery of said object captured by a second mobile device under a second lighting condition;

receiving additional sets of feature point data for said object, said additional sets of feature point data having been produced from additional imagery of said object captured by additional devices; and generating an enhanced set of feature point data for said object, said generating including discarding a feature point included in one of said sets that does not match a feature point included in the other of said sets;

wherein the method further includes the acts of receiving a first feature descriptor for a feature point produced from third imagery, and receiving a second feature descriptor for said feature point produced from fourth imagery, each of said feature descriptors having a figure of merit associated therewith, wherein the method further includes weighting said first and second feature descriptors by their respective figures of merit in producing a consensus feature descriptor for said feature point.

19. The method of claim 18 that further includes generating the figure of merit for said first feature descriptor.

20. The method of claim 19 that includes generating the figure of merit for said first feature descriptor using metadata associated with the third imagery.

* * * * *